United States Patent
Yamamoto

(10) Patent No.: US 7,374,023 B2
(45) Date of Patent: May 20, 2008

(54) FLOATING-TYPE BRAKE DISK

(75) Inventor: Shusuke Yamamoto, Shizuoka-ken (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 0 days.

(21) Appl. No.: 10/514,552

(22) PCT Filed: May 26, 2003

(86) PCT No.: PCT/JP03/06517

§ 371 (c)(1),
(2), (4) Date: Nov. 29, 2004

(87) PCT Pub. No.: WO03/100281

PCT Pub. Date: Dec. 4, 2003

(65) Prior Publication Data

US 2005/0145452 A1    Jul. 7, 2005

(30) Foreign Application Priority Data

| May 27, 2002 | (JP) | ............................. 2002-152746 |
| May 27, 2002 | (JP) | ............................. 2002-152747 |
| Mar. 7, 2003 | (JP) | ............................. 2003-061514 |

(51) Int. Cl.
   *B60T 1/06* (2006.01)
   *F16D 65/12* (2006.01)
(52) U.S. Cl. .............................. 188/18 A; 188/218 XL
(58) Field of Classification Search ............. 188/18 A, 188/218 XL, 218 R
See application file for complete search history.

(56) References Cited

U.S. PATENT DOCUMENTS

| 3,542,166 | A |   | 11/1970 | Harrison |
| 4,043,437 | A | * | 8/1977  | Taylor ................... 188/218 XL |
| 4,256,209 | A | * | 3/1981  | Lupertz ................ 188/218 XL |

FOREIGN PATENT DOCUMENTS

DE    19850180 A1 *  7/1999

(Continued)

*Primary Examiner*—Thomas Williams
(74) *Attorney, Agent, or Firm*—Arent Fox LLP

(57) ABSTRACT

The invention provides a floating type brake disc which can absorb a shock applied to a hub from a rotor at a time of running on a punishing road, can improve a heat lowering performance and can widely reduce a number of parts. A brake disc (1) is constituted by a hub (20), a rotor (10) and a ring spring (30). A lot of protrusion portions (11) in a radial direction are provided along a peripheral direction in an inner peripheral edge portion of the rotor (10), the same number of projection portions (21) in an axial direction are provided along the peripheral direction in an outer peripheral edge portion of the hub (20), and the protrusion portions (11) are protruded to an inner side in the radial direction through a gap (22) between the projection portions (21). The ring spring (30) is constituted by an open ring having an approximately L-shaped cross section. A line (30*b*) in a radial direction of the ring spring is fitted and mounted to a groove (23) in an inner peripheral surface of the projection portion (21) of the hub protruding from the rotor, and an inner peripheral surface of a protrusion portion (12) in the rotor is pressed to an outer side in the radial direction by a line (30*a*) in the axial direction of the ring spring.

12 Claims, 17 Drawing Sheets

FOREIGN PATENT DOCUMENTS

| | | | | |
|---|---|---|---|---|
| DE | 19918667 A1 | * | 10/2000 | |
| DE | 10125115 A1 | * | 12/2002 | |
| EP | 1074757 A1 | * | 2/2001 | |
| GB | 2150263 A | * | 6/1985 | |
| GB | 2184801 A | * | 7/1987 | |
| JP | 54-152759 A | | 12/1979 | |
| JP | 60-3333 | | 1/1985 | |
| JP | 11218167 A | * | 8/1999 | |
| JP | 2003206965 A | * | 7/2003 | |
| WO | WO 96/41967 A | | 12/1996 | |
| WO | WO 00/06922 A | | 2/2000 | |
| WO | WO 00/09903 A | | 2/2000 | |

* cited by examiner

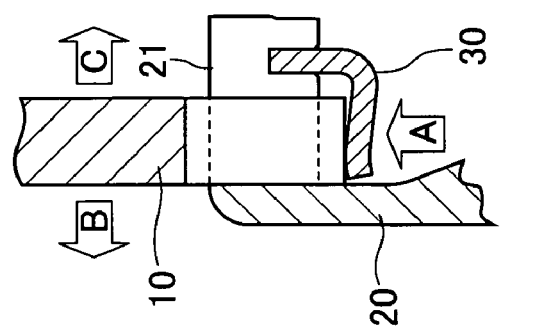
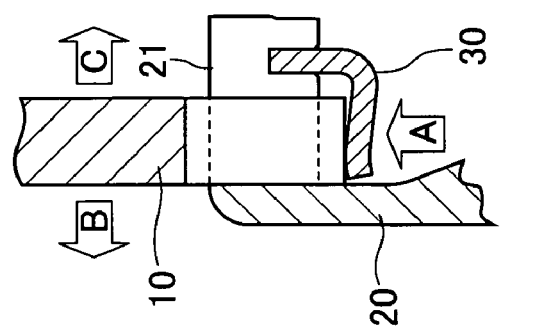
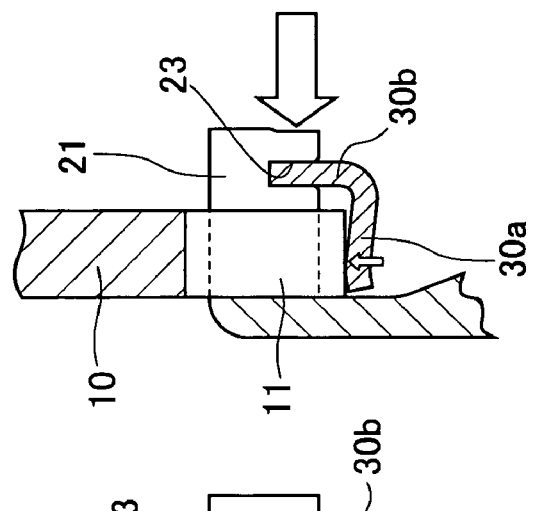
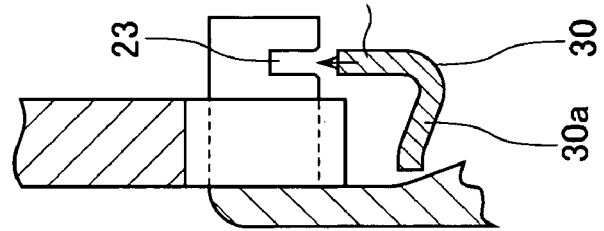
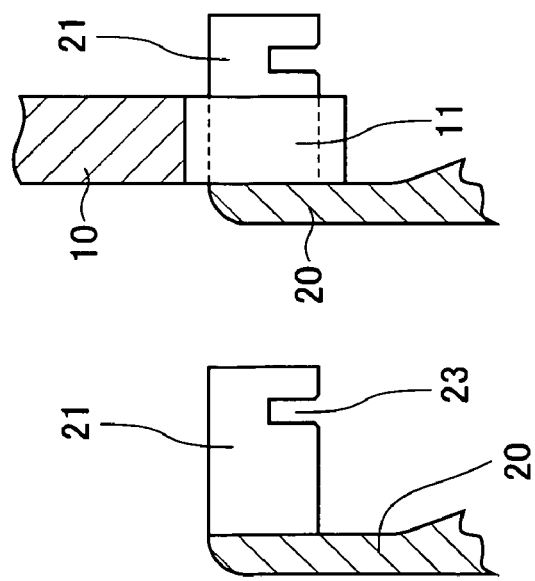

FIG.7A
FIG.7B
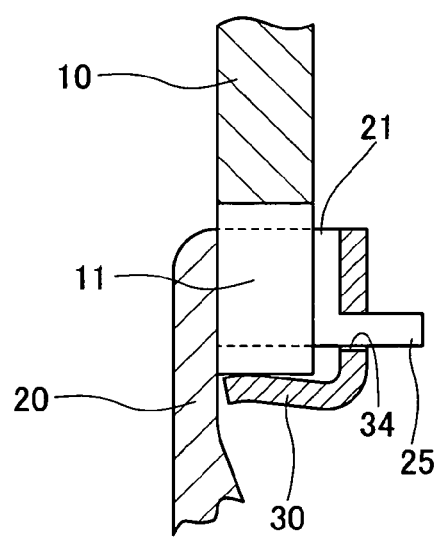
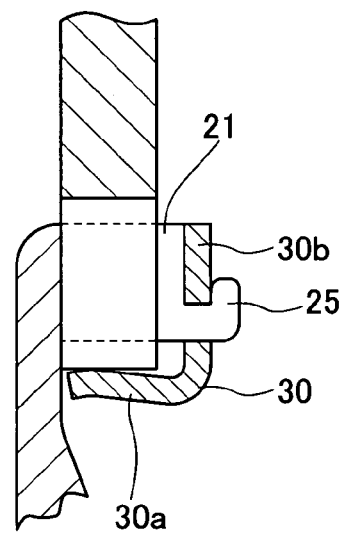
FIG.7C
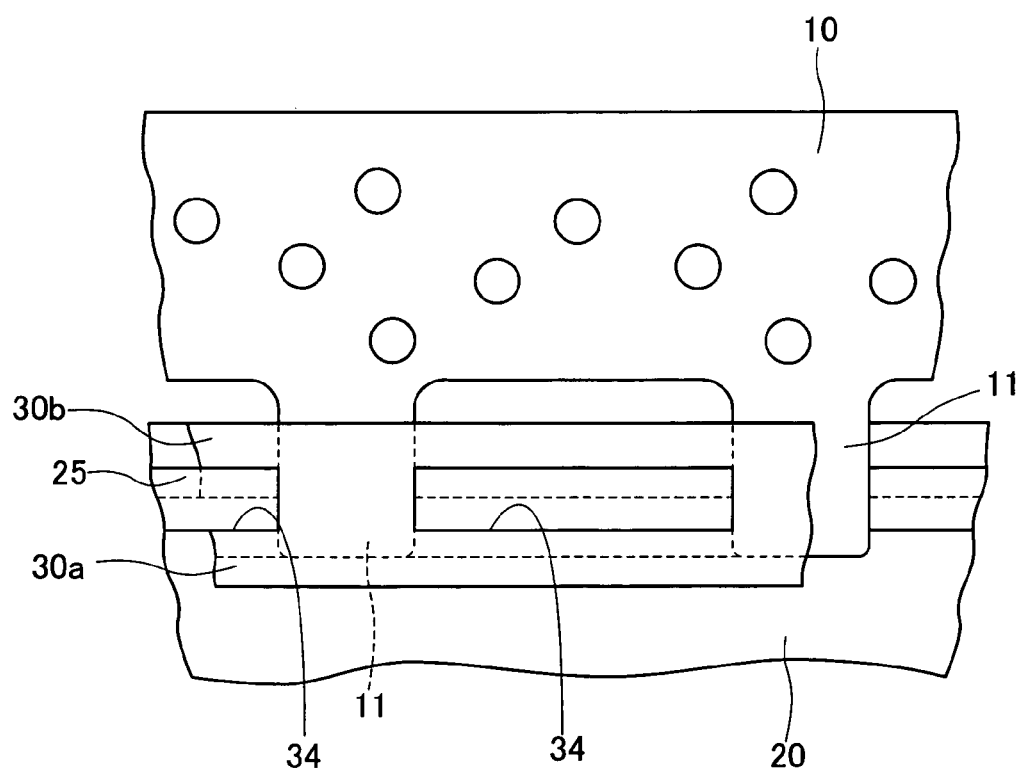

FLOATING-TYPE BRAKE DISK

CROSS-REFERENCE TO RELATED APPLICATION

This application is a National Stage entry of International Application Number PCT/JP03/06517, filed May 26, 2003. The disclosure of the prior application is hereby incorporated herein in its entirety by reference.

TECHNICAL FIELD

The present invention relates to a floating type brake disc for a disc brake used for braking a vehicle, such as a motor cycle or the like.

BACKGROUND ART

A floating type brake disc is structured by connecting a disc-like aluminum hub, and an annular stainless steel rotor coaxially arranged in an outer side of the hub by an elastic member.

A conventional floating type brake disc is provided with a hub "a" having semicircular recess portions "a1" in an outer peripheral edge portion leaving a space in a circumferential direction, and a rotor "b" having semicircular recess portions "b1" in an inner peripheral edge portion leaving a space in a circumferential direction, as shown in FIG. 21, and is prevented from coming off by butting the recess portion "a1" of the hub "a" to the recess portion "b1" of the rotor "b", inserting a common pin "c" having a flange "c1a" in one end to a circular hole formed by the recess portions "a1" and "b1" via a washer as required, fitting and inserting a disc spring "c2" and a washer "c3" to another end "c1b" of the pin "c", and thereafter expanding another end "c1b" of the pin "c" to an outer side so as to caulk in a disc shape. Thus, the floating type brake disc is structured by floatably connecting the hub "a" and the rotor "b" in a thrust direction. The disc spring "c2" is in contact with the hub "a" and the rotor "b" (refer, for example, to FIG. 2 in Japanese Unexamined Utility Model Publication No. 60-3333).

In order to avoid an interference between a wheel and the brake disc, an outer peripheral edge portion of the hub "a" is generally offset to an outer side in an axial direction (a thrust direction) via an intermediate portion "a2" which is linearly inclined along a radial direction with respect to an inner peripheral mounting portion to a side wheel.

In this conventional brake disc, a floating portion (a connection portion) is prevented from being rattle in the thrust direction by pressing and fixing the rotor to the flange portion of the pin from the thrust direction (a side surface of the rotor) by the disc spring or the like, and is prevented from being rattle in the radial direction by an assistance of the disc spring. A heat generated in the rotor gets away from the connection portion to the aluminum hub.

In the conventional brake disc, since the connection portion between the hub and the rotor by the pin is arranged at seven to ten positions, there is a problem that a number of the parts is much. For example, a seven-axis specification (seven-position connection specification) requires thirty parts (including (pin+disc spring+washer×2)×7+rotor+hub), and a ten-axis specification (ten-position connection specification) requires forty two parts (including (pin+disc spring+washer×2)×10+rotor+hub). Accordingly, an assembling man-hour thereof is increased, and a cost is increased.

In recent years, in connection with a cost reduction, a weight saving and the like, the number of the pins tends to be reduced. In the case that the number of the pins is reduced, there are generated a portion in which the heat of the rotor tends to be discharged, and a portion in which the heat tends to be kept. Accordingly, a thermal stress near a pierce hole formed on a sliding surface of the rotor becomes high, whereby a crack tends to be generated.

Further, in the conventional brake disc, a floating performance and an increase of spring setting load tend to be opposite to each other. Accordingly, the higher a set load (a fixing load) by the spring from the thrust direction is, the more advantageous the rattle prevention in the radial direction is, however, the floating performance in the thrust direction is deteriorated. Further, the disc spring is in contact with the hub and the rotor, however, since the thickness of the hub and the rotor have a dispersion within a tolerance, a deflection of the disc spring has a dispersion within the disc spring.

Further, since a constraint force from the thrust direction is strong, the brake disc is hard to adapt itself to brake pads at a time of being pinched by the brake pads so as to generate a thermal strain. Further, since the rotor is brought into contact with the flange side of the pin on the basis of the constrain from the thrust direction, it is necessary to improve an initial deflection accuracy. If the initial deflection accuracy is low, a part (having a large deflection) of the rotor is in contact with the pad during running (during rotation of the rotor), and a biased abrasion is generated. As a result, when applying the brake, a judder (an abnormal vibration) is caused by the biased abrasion.

In this case, since the brake disc tends to adapt itself to the pads by making the constraint force from the thrust direction weak, the floating performance is improved (the floating performance is improved so as to tend to adapt itself to the pads), however, the rattle in the radial direction tends to be generated. Accordingly, the rotor gives a shock to the pin/hub during running on a punishing road so as to cause a breakage of the hub.

Further, since the load of the brake disc corresponds to a non-suspended load (an unspring weight) applying a great influence to a steering stability of the vehicle, there is a tendency that a weight saving of the brake disc is intended, and a weight saving hole provided in the hub "a" and the rotor "b" is enlarged. However, since it is necessary to secure a certain degree of calorific capacity in the rotor portion, there is a limit to enlarge the weight saving hole. Accordingly, there is a great demand to enlarge the weight saving hole in the hub "a", however, in the case that an area of the rib "a3" between the weight saving holes is reduced by enlarging the weight saving hole in the intermediate portion "a2", a strength in a lateral direction (the thrust direction) of the hub "a" becomes weak, and a strength in a torsional direction becomes weak.

An object of the present invention is to provide a floating type brake disc which can improve a heat lowering performance and can widely reduce a number of parts, taking the conventional problems mentioned above into consideration.

Another object of the present invention is to provide a floating type brake disc which can absorb a shock applied to the hub from the rotor at a time of running on the punishing road, in addition to the advantage mentioned above.

The other object of the present invention is to provide a floating type brake disc which can improve a strength in a thrust direction and a torsional direction of the hub even in the case that the weight saving hole of the hub is enlarged, in addition to the advantages mentioned above.

DISCLOSURE OF INVENTION

In order to achieve the object mentioned above, in accordance with a first aspect of the present invention, there is provided a floating type brake disc comprising a hub, a rotor coaxially arranged in an outer side of the hub, and an elastic member mounting the rotor to the hub floatably in an axial direction, wherein the rotor is mounted to the hub in a state in which the rotor is pressed in a radial direction by the elastic member.

In accordance with the present invention, the structure may be made such that a lot of protruding portions in a radial direction are provided in an inner peripheral edge portion of the rotor so as to leave a space in a peripheral direction, the same number of projection portions in an axial direction as the number of the protruding portions are provided in a back surface side of an outer peripheral edge portion of the hub so as to leave a space in a peripheral direction, the protruding portions of the rotor are protruded to an inner side in the radial direction through a portion between the projection portions of the hub, and a ring spring having an approximately L-shaped cross section and pressing an inner peripheral surface of the protruding portions of the rotor to an outer side in the radial direction by one line is fixed to a portion of the projection portions of the hub protruding in the axial direction from the protruding portion of the rotor. For example, the structure may be made such that a groove extending along a peripheral direction is provided in an inner peripheral surface of the portion of the projection portions of the hub protruding in the axial direction from the protruding portion of the rotor, another line of the ring spring is fitted to the groove, and the groove is collapsed by caulking the projection portion, whereby the ring spring is fixed to the projection portion. The structure may be made such that a step portion is provided in an inner peripheral surface of the portion of the projection portions of the hub protruding in the axial direction from the protruding portion of the rotor, another line of the ring spring is brought into contact with the step portion, and the ring spring is fixed to the projection portion by caulking the projection portion from the above of the another line. The structure may be made such that a protruding piece in the axial direction is provided in a protruding manner in the projection portion of the hub, a hole is provided in another line of the ring spring so as to insert the protruding piece to the hole, and the ring spring is fixed to the projection portion by caulking the inserted protruding piece from the above of the another line. In this case, the structure may be made such that a protruding piece in the axial direction is formed by notching one line of the ring spring, and a pressure contact projection toward an outer side in the radial direction is provided in the protruding piece.

Further, the structure may be made such that a lot of protruding portions in a radial direction are provided in an inner peripheral edge portion of the rotor so as to leave a space in a peripheral direction, the same number of projection portions in an axial direction as the number of the protruding portions are provided in a back surface side of an outer peripheral edge portion of the hub so as to leave a space in a peripheral direction, the protruding portions of the rotor are protruded to an inner side in the radial direction through a portion between the projection portions of the hub, a ring spring having a corrugated plate shape and pressing to an outer side in the radial direction is pressure contacted with an inner peripheral surface of the protruding portion, and a hold ring having an approximately L-shaped cross section and holding an inner peripheral surface of the ring spring by one line is fixed to a portion of the projection portions of the hub protruding in the axial direction from the protruding portion of the rotor.

Further, the structure may be made such that a lot of protruding portions in a radial direction are provided in an inner peripheral edge portion of the rotor so as to leave a space in a peripheral direction, the same number of projection portions in an axial direction as the number of the protruding portions are provided in a back surface side of an outer peripheral edge portion of the hub so as to leave a space in a peripheral direction, the protruding portions are protruded to an inner side in the radial direction through a portion between the projection portions, a step portion is provided in an outer edge portion of the hub so as to leave a space in the radial direction with the protruding portion of the rotor, a ring spring pressing an inner peripheral surface of the protruding portion to an outer side in the radial direction is fitted to a portion between the step portion and the protruding portion, and a come-off prevention member of the rotor is mounted to a portion of the projection portion of the hub protruding in the axial direction from the protruding portion of the rotor.

The structure may be made such that a lot of protruding portions in a radial direction are provided in an inner peripheral edge portion of the rotor so as to leave a space in a peripheral direction, the same number of projection portions in an axial direction as the number of the protruding portions are provided in a back surface side of an outer peripheral edge portion of the hub so as to leave a space in a peripheral direction, the protruding portions are protruded to an inner side in the radial direction through a portion between the projection portions, a step portion is provided in an outer peripheral edge portion of the hub so as to leave a space in the radial direction with the protruding portion of the rotor, a coil spring pressing an inner peripheral surface of the protruding portion to an outer side in the radial direction is mounted to the step portion, and a come-off prevention member of the rotor is mounted to a portion of the projection portion of the hub protruding from the protruding portion of the rotor.

Further, the structure may be made such that an outer peripheral edge portion of the hub is offset to an outer side in the axial direction with respect to the mounting portion to a wheel in an inner peripheral side of the hub, and a cross section along the radial direction in an intermediate portion between the mounting portion of the hub and the outer peripheral edge portion is bent so as to be convex to an inner side of the axial direction.

In accordance with the present invention, the following operations and effects can be obtained.

(1) Since a spring tension is applied in the radial direction (to an inner diameter portion of the rotor) while making an end to apply the spring tension to the rotor from the thrust direction, a vertical vibration of the rotor generated at a time when the vehicle runs on the punishing road can be absorbed by the spring tension of the elastic member, and it is possible to absorb a shock to the hub.

(2) Since the spring tension which the rotor received from the inner peripheral surface side is largely applied to a force by which the rotor is vertically moved, and is small applied to a force by which the rotor is laterally moved, the brake disc adapt itself to the brake pads at a time of being pinched by the pads, so that the thermal strain is hard to be generated.

(3) Since no spring tension is applied in the thrust direction, it is unnecessary to correct the initial deflection accuracy of the brake disc. Further, since the dragging torque is reduced, the biased abrasion caused by the contact with the pad in a part (having a large deflection) of the rotor during the running (during the rotation of the rotor) is not generated, so that it is possible to prevent the judder caused by the biased abrasion at a time of applying the brake. A brake noise, that is, a creaking noise of the brake is reduced.

(4) Since the tension is not applied from the thrust direction, the following property of the rotor to the brake pad is improved, and the rotor stops at a proper position pinched between the brake pads. Further, since the tension is applied from the inner peripheral surface side of the rotor, the rotor is not rattled in the thrust direction at the stop position.

(5) The ring spring, the coil spring or the like is used as the elastic member, however, since the constituting parts of the brake disc are constituted by three kinds of parts including the rotor, the hub and the spring, it is possible to widely reduce the number of the parts in comparison with the conventional brake disc, for example, having thirty parts. In particular, in the case of using the ring spring, the brake disc can be structured by three parts including the rotor, the hub and the ring spring to the minimum.

(6) Since the protruding portions of the rotor and the projection portions of the hub are provided at a lot of positions, for example, ten or more positions, a heat lowering property of the rotor via the elastic member is improved, and it is possible to prevent a crack from being generated by an increase of the thermal stress near the pierce hole formed on the sliding surface of the rotor. In particular, since it is possible to get away the heat of the rotor by the ring spring in all the periphery of the hub in the case that the ring spring is used as the elastic member, the heat lowering performance can be improved significantly.

(7) In the case that the ring spring is used for connecting the hub and the rotor, it is possible to connect the hub and the rotor at a high strength.

(8) Since the projection portions in the axial direction are provided in the hub, it is possible to improve a strength in the thrust direction of the hub.

(9) In the type that the ring spring is fixed to the projection portion of the hub by inserting the protruding piece provided in the projection portion to the hole provided in another line of the ring spring and caulking the protruding piece, if the protruding piece is formed by notching in one line of the ring spring and the protrusion piece is previously provided with the pressure contacting projection in the outer side in the radial direction, it is possible to improve the ring spring setting property.

(10) In the case of inclining in such an aspect that the cross section along the radial direction is bent so as to be convex to the inner side in the axial direction, in place of inclining the intermediate portion between the mounting portion of the hub and the outer peripheral edge portion linearly, a strength in the thrust direction and a strength in the torsional direction of the intermediate portion are improved, and it is possible to prevent the strength in the thrust direction and the strength in the torsional direction of the intermediate portion from being lowered, even if the area of the rib between the weight saving holes is reduced by enlarging the weight saving hole provided in the intermediate portion. Accordingly, it is possible to save the weight of the hub on the basis of the enlargement of the weight saving hole, and it is possible to save the weight by making the hub thin. Further, a surface area of the intermediate portion is increased by bending the intermediate portion, and a heat radiating performance of the hub is improved. Further, in the case that the projection portion of the hub is provided in correspondence to the weight saving hole, the lowering property of the heat transferred to the hub from the rotor is further improved.

In accordance with an eleventh aspect of the present invention, there is provided a floating type brake disc comprising a hub, a rotor coaxially arranged in an outer side of the hub, and an elastic member mounting the rotor to the hub floatably in an axial direction, wherein a lot of protruding portions in a radial direction are provided in an inner peripheral edge portion of the rotor so as to leave a space in a peripheral direction, the same number of projection portions in an axial direction as the number of the protruding portions of the rotor are provided in a back surface side of an outer peripheral edge portion of the hub so as to leave a space in a peripheral direction, the projection portions of the hub are protruded to an inner side in the axial direction through a portion between the protruding portions of the rotor, a hole is provided in a band-like ring spring having a curved rectangular cross sectional shape and pressing the protruding portion in the axial direction, the projection portion is provided with a protruding piece in the axial direction, and the ring spring is fixed to the projection portion by inserting the protruding piece to the hole and caulking the protruding piece.

In accordance with the present invention, the ring spring is constituted by a discontinuous open ring spring which is interrupted in one position in a circumferential direction, a continuous integrally formed ring spring having no interruption, or a divided ring spring which is divided at a plurality of positions in the circumferential direction. The outer peripheral edge portion of the hub is offset to an outer side in the axial direction with respect to the mounting portion to the wheel in the inner peripheral side of the hub, and the cross section extending along the radial direction of the intermediate portion between the mounting portion and the outer peripheral edge portion of the hub can be bent so as to be convex to the inner side in the axial direction.

In accordance with the present invention, divided ring spring can be used, however, since the constituting parts of the brake disc are constituted by three kinds of parts including the rotor, the hub and the ring spring, it is possible to significantly reduce the number of the parts in comparison with the conventional brake disc, for example, constituted by forty two parts (the ten-axis specification). In accordance with this, it is possible to widely reduce the assembling man-hour and cost. In particular, in the case of using the ring spring, the brake disc can be structured by three parts including the rotor, the hub and the ring spring to the minimum. Further, since the protruding portions of the rotor and the projection portions of the hub are provided at a lot of positions, for example, ten or more positions, a heat lowering property of the rotor is improved, and it is possible to prevent a crack from being generated by an increase of the thermal stress near the pierce hole formed on the sliding surface of the rotor. In particular, since it is possible to get away the heat of the rotor by the ring spring in all the periphery of the hub in the case that the ring spring is used, the heat lowering performance is improved significantly in accordance with this view. Further, since the contact surface of the ring spring is positioned in the same surface on the rotor, it is possible to prevent the deflection of the spring from being dispersed.

BRIEF DESCRIPTION OF DRAWINGS

FIGS. 4A to 4E are cross sectional views showing an assembling method of the brake disc in accordance with the embodiment 1;

FIGS. 7A and 7B are cross sectional views showing an assembling method in another modified example of the embodiment 1, and FIG. 7C is a front elevational view of a brake disc in accordance with the modified example;

BEST MODE FOR CARRYING OUT THE INVENTION

Embodiment 1

A description will be in detail given below of embodiments in accordance with the present invention with reference to the accompanying drawings.

Figure 1A:
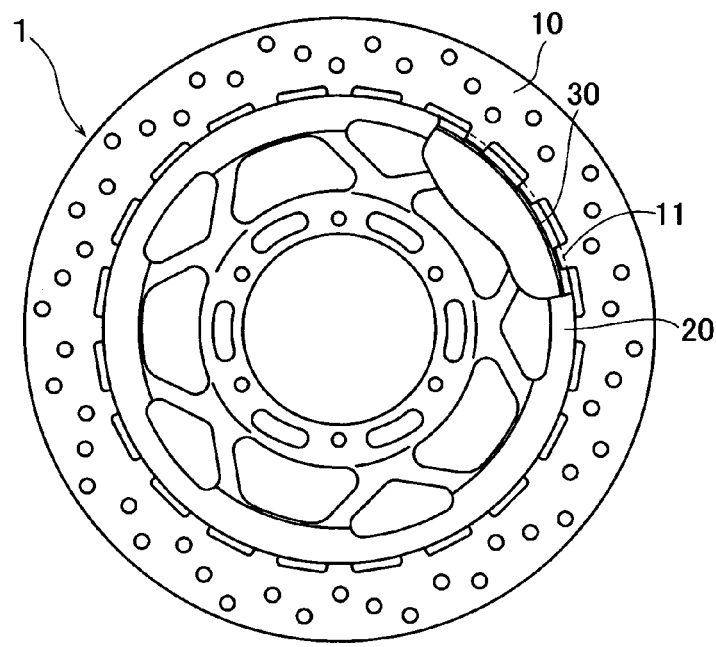
FIGS. 1A and 1B are respectively a front elevational view and a back elevational view showing an embodiment 1 of a floating type brake disc in accordance with the present invention.
Figure 1B:
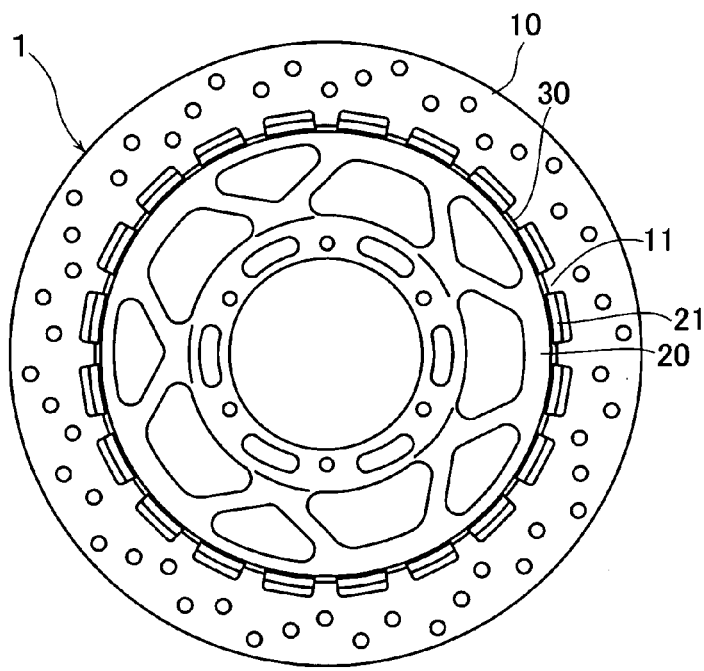
Figure 2A:
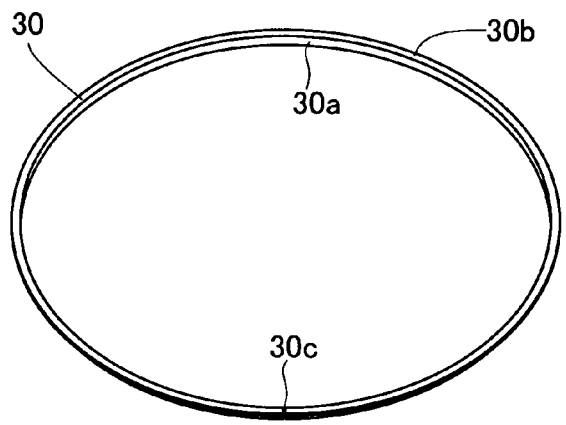
FIGS. 2A, 2B and 2C are perspective views of constituting parts of the brake disc in accordance with the embodiment 1 as seen from a back surface side, in which the constituting parts comprise a ring spring, a rotor and a hub.
Figure 2B:
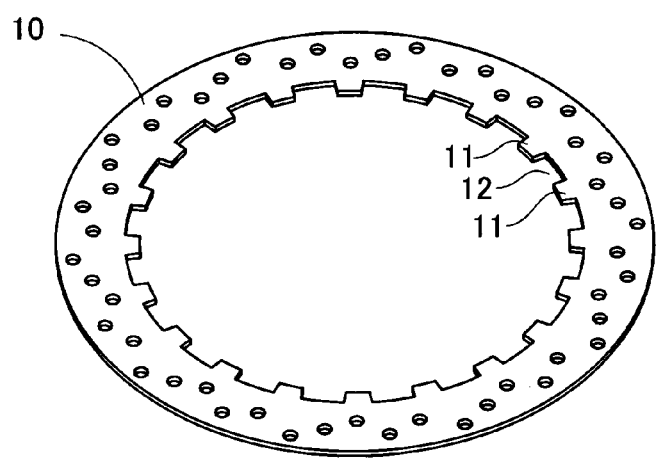
Figure 2C:
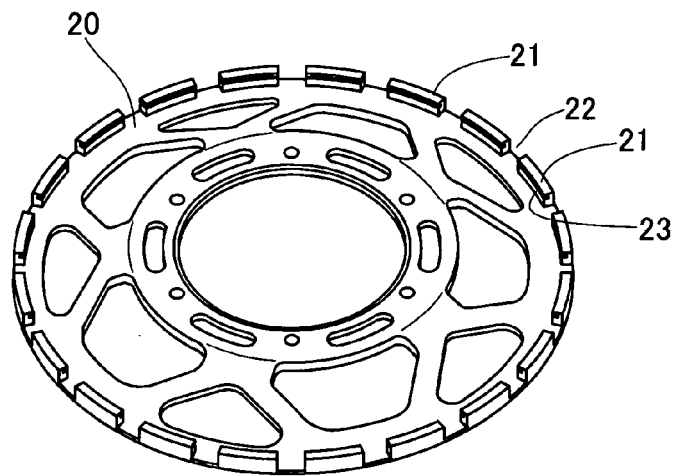
Figure 3:
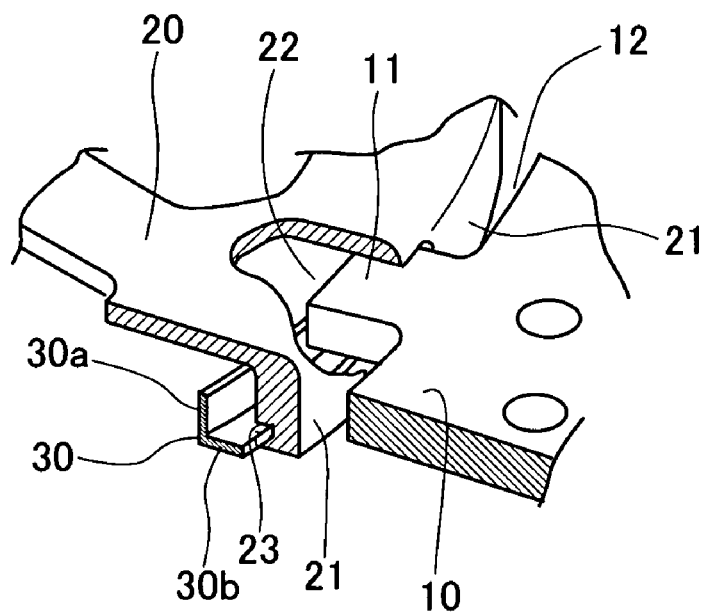
FIG. 3 is a perspective view showing a part of the brake disc in accordance with the embodiment 1 in a partly cutting manner.

FIGS. 1A and 1B are views showing an embodiment of a floating type disc brake in accordance with the present invention, in which FIG. 1A is a front elevational view and FIG. 1B is a back elevational view. FIG. 2 is a perspective view of constituting parts of the brake disc as seen from a back surface side, FIG. 3 is a perspective view showing a part of the brake disc in a partly cutting manner from a front surface side, and FIG. 4 is a cross sectional view showing an assembling method of the brake disc.

As shown in FIG. 1, a floating type brake disc 1 in accordance with the present embodiment is constituted by an annular rotor 10, a disc-like hub 20 and an annular ring spring 30.

The rotor 10 is provided, as shown in FIG. 2, with a lot of, for example, ten to twenty four, protruding portions 11 in a radial direction in an inner peripheral edge portion so as to leave a space in a peripheral direction, twenty protruding portions are provided in the present embodiment. The protruding portion 11 of the rotor 10 is provided with a protruding length lapping over an outer peripheral edge portion of the coaxially arranged hub 20. The hub 20 is provided with projection portions 21 protruding in an axial direction (the same direction as a direction of an axle) in a back surface side of the outer peripheral edge portion so as to leave a space in a peripheral direction. The projection portions 21 are provided at the same number as the number of the protruding portions 11 of the rotor 10, that is, twenty. The rotor 10 and the hub 20 are coaxially overlapped, and as shown in FIG. 3, the protruding portion 11 of the rotor 10 protrudes through a gap 22 between the projection portions 21 of the hub 20, and faces to an inner side in a radial direction.

The ring spring 30 is constituted by a discontinuous elastic metal open ring separated at one position 30c in a peripheral direction. The ring spring 30 is formed in such an approximately L-shaped cross sectional shape that another circular line 30b in a radial direction comes next outwardly one end of one circular line 30a in an axial direction, by bending so as to form a slightly smaller angle than a right angle. The floating type brake disc 1 is structured by fixing the ring spring 30 to an inner peripheral surface of a leading end portion protruding from the rotor 10 in the projection portion 21 of the hub 20, thereby energizing the protruding portion 11 in a state of being pressed to an outer side in a radial direction by the ring spring 30, and mounting the rotor 10 to the hub 20 so as to be floatable in the axial direction.

A description will be given further of an assembling method of a brake disc with reference to FIG. 4. In the present embodiment, a groove 23 extending along a peripheral direction is provided on an inner peripheral surface of a leading end portion of the projection portion 21 in the hub 20 (FIG. 4A). The protruding portion 11 protrudes from the projection portion 21 through a gap 22 and is positioned in a state of facing to an inner side in a radial direction, by coaxially overlapping the hub 20 and the rotor 10 and inserting the protruding portion 11 of the rotor 10 to the gap 22 between the projection portions 21 of the hub 20 (FIG. 4B). Under this state, in the hub 20, the leading end portion of the projection portion 21 protrudes to a back surface side through the gap 12 between the protruding portions 11 of the rotor 10. Next, the ring spring 30 is expanded by the inner peripheral surface side of the protruding portion 11 of the rotor 10, and one line (the line in the axial direction) 30*a* of the ring spring 30 is pressure contacted with the inner peripheral surface of the protruding portion 11, by deflecting the ring spring 30 so as to contract the ring spring and fitting and mounting another line (the line in the radial direction) 30*b* of the ring spring 30 to the groove 23 on the inner peripheral surface of the leading end portion of the projection portion 21 in the hub 20 protruding from the rotor 10 (FIG. 4C).

Further, in order to prevent the ring spring 30 from coming off from the hub 20, another line 30*b* of the ring spring 30 is fixed to the projection portion 21 by caulking the end surface 21*a* of the projection portion 21 protruding from the protruding portion 11 near a position of the groove 23 of the projection portion 21 by a light pressing by means of a press machine so as to collapse the groove 23 (FIG. 4D). Normally, the hub 20 is made of an aluminum (including an aluminum alloy), and is surface treated by an alumite or the like, however, a film thickness of the surface is thin and suitable for being caulked, and no crack is generated in the film on the surface by the caulking by means of the press machine.

The floating type brake disc 1 in accordance with the present embodiment is assembled in the manner mentioned above, and achieves a spring tension (shown by an arrow A in FIG. 4E) applied from the inner peripheral surface side of the rotor 10 in the radial direction, and a come-off prevention of the rotor 10 in the thrust direction, by mounting the ring spring 30 to the hub 20. The brake torque applied to the peripheral direction of the rotor 10 is received by an end surface in the peripheral direction of the hub 20, that is, an outer peripheral surface including the projection portion 21.

Further, a load in a floating direction (a thrust direction) (shown by arrows B and C in FIG. 4E) can be reduced by the spring tension applied from the direction of the arrow A. Accordingly, it is possible to cut down a dragging torque of the rotor and it is possible to cut down a thermal strain amount. Therefore, since an abnormal contact between the rotor 10 and the brake pad is reduced, and a local abrasion of the thickness is prevented, a judder generation is not caused.

Figure 5A:
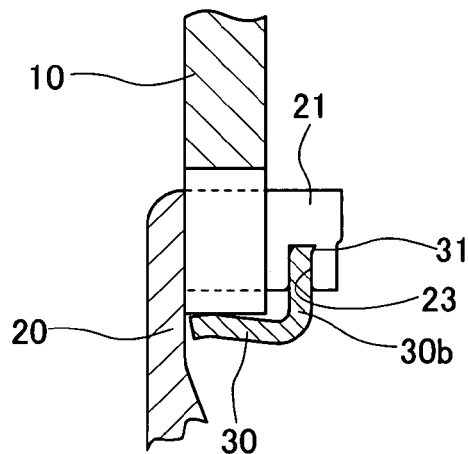
FIGS. 5A to 5C are views showing various examples of a method of preventing the ring spring from coming off from the hub in the brake disc shown in FIG. 1.
Figure 5B:
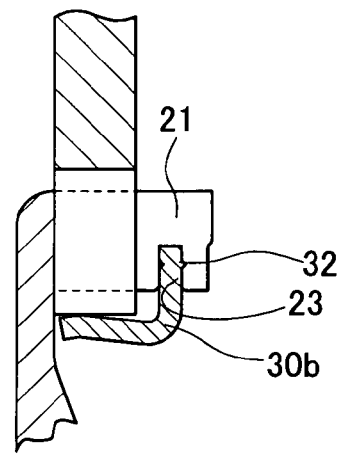
Figure 5C:
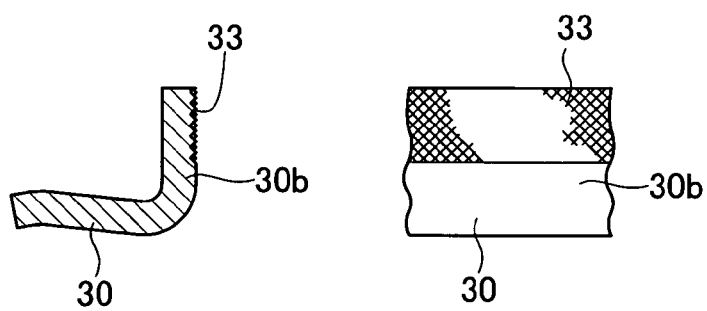

In the structure mentioned above, if a projection 31 is formed by press working in a side surface portion of a leading end of the line 30*b* in the radial direction of the ring spring 30, as shown in FIG. 5A, a dowel projection 32 is formed in the middle of the side surface portion of another line 30*b*, as shown in FIG. 5B, or a cross hatch scratch 33 to enlarge a friction coefficient of another line 30*b* is formed in the side surface of the leading end portion of another line 30*b* by roughening process, such as a knurling or the like, as shown in FIG. 5C, it is possible to prevent the ring spring 30 from coming off within the groove 23 on the basis of the catch. Accordingly, it is possible to securely prevent the ring spring 30 from coming off.

Figure 6A:
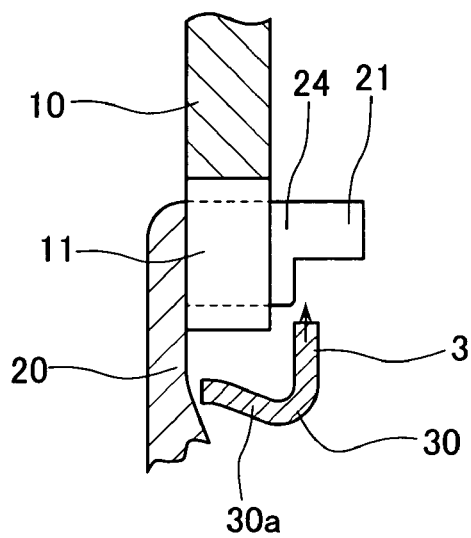
FIGS. 6A and 6B are cross sectional view showing an assembling method in a modified example of the embodiment 1.
Figure 6B:
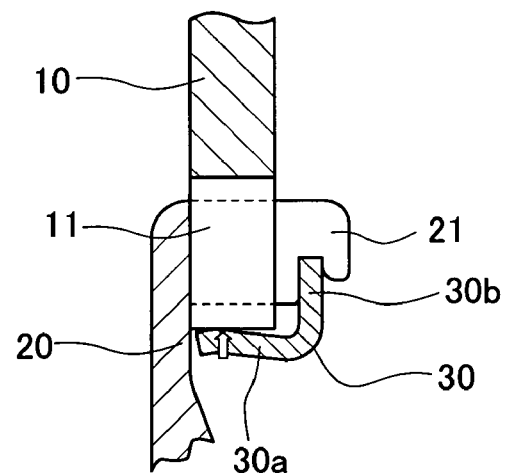

As a method of mounting the ring spring 30 to the hub 20, there can be employed, for example, a method of fixing another line 30*b* to the projection portion 21 by forming a step portion 24 in an inner peripheral surface side of the leading end portion of the projection portion 21 and bringing another line 30*b* of the ring spring 30 into contact with the step portion 24, as shown in FIG. 6A, and caulking the leading end portion of the projection portion 21 by press working from the above of another line 30*b* so as to collapse, as shown in FIG. 6B. In this case, the ring spring 30 may be constituted by an open ring which is separated at one position in the peripheral direction, or an integrally formed type ring having no separation.

Alternatively, the ring spring 30 may be fixed to the projection portion 21 by extending a protrusion piece 25 protruding in the axial direction toward the peripheral direction at a position close to the inner peripheral surface of the projection portion 21 of the hub 20, forming a peripherally oblong hole 34 slightly larger than the protrusion piece 25 at a position close to the inner side in the radial direction of another line 30*b* of the ring spring 30, and inserting the protrusion piece 25 to the oblong hole 34 by pressing the ring spring 30 in the axial direction, as shown in FIG. 7A, and bending the inserted protrusion piece 25 to an outer side in the radial direction from the above of another line 30*b* so as to caulk, as shown in FIGS. 7B and 7C. The ring spring 30 may be constituted by the open ring or the integrally formed ring.

Figures 8A, 8B:
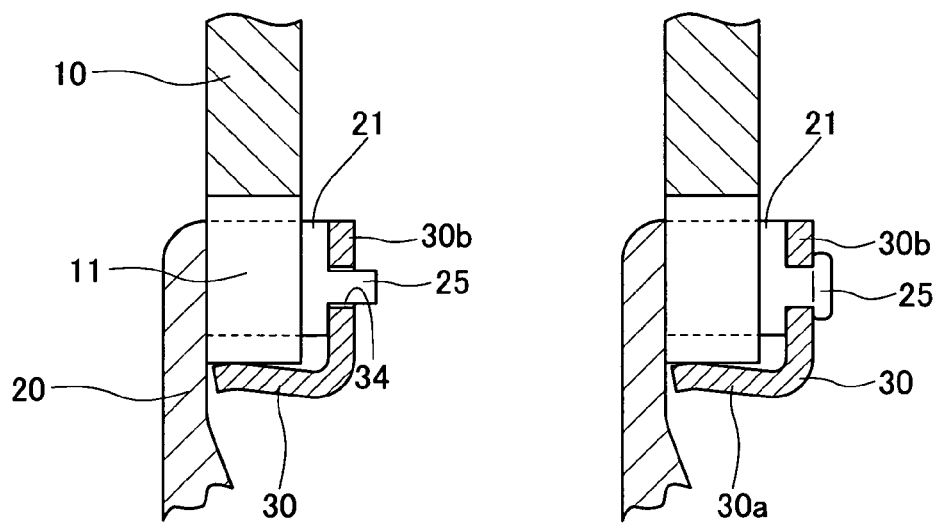
FIGS. 8A and 8B are cross sectional views showing an assembling method in the other modified example of the embodiment 1.
Figure 8C:
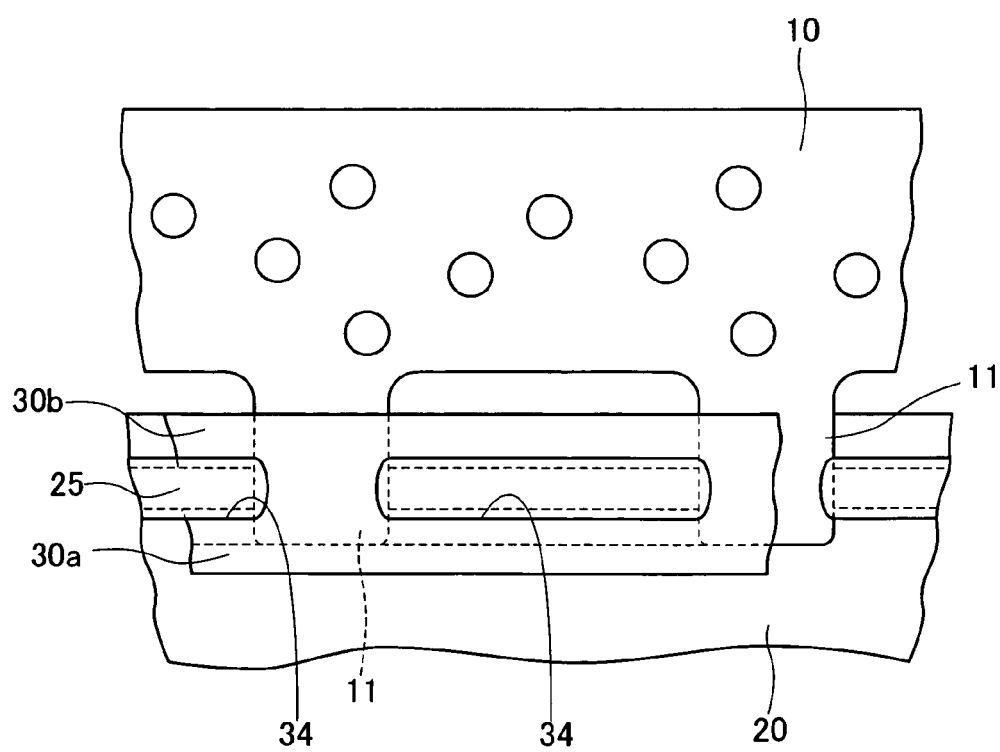
FIG. 8C is a front elevational view of a brake disc in accordance with the modified example.

The ring spring 30 may be fixed to the projection portion 21 by extending the protrusion piece 25 protruding in the axial direction toward the peripheral direction at the position close to the inner peripheral surface of approximately center portion of the projection portion 21 of the hub 20, forming the peripherally oblong hole 34 at the position close to the inner side in the radial direction of another line 30*b* of the ring spring 30, and inserting the protrusion piece 25 to the oblong hole 34, as shown in FIG. 8A, and caulking the inserted protrusion piece 25 from the above of another line 30*b*, as shown in FIGS. 8B and 8C.

Since the floating type brake disc in accordance with the present embodiment is structured as mentioned above, the following operation and effects can be achieved.

(1) Since the spring tension is applied in the radial direction to the rotor 10 while making an end to apply the spring tension to the rotor 10 in the thrust direction, the vertical vibration of the rotor 10 generated at a time when the vehicle runs on the punishing road can be absorbed by the spring tension of the ring spring 30, and it is possible to absorb the shock to the hub 20. Accordingly, a durability of the hub is increased, and it is possible to apply a high durability to the brake disc.

(2) Since the spring tension which the rotor 10 received from the inner peripheral surface side is largely applied to the force by which the rotor 10 is moved vertically (in the radial direction), and is small applied to the force by which the rotor is moved laterally (in the thrust direction), the brake disc adapts itself to the brake pads at a time of being pinched by the pads. Further, since the dragging torque is reduced, the biased abrasion caused by the contact with the pad in a part (having a large deflection) of the rotor 10 during the running (during the rotation of the rotor) is not generated, so that it is possible to prevent the judder caused by the biased abrasion at a time of applying the brake. A brake noise, that is, a creaking noise of the brake is reduced, and the brake pads adapt themselves to the brake disc, so that the thermal strain is hard to be generated.

(3) Since no spring tension is applied in the thrust direction, it is unnecessary to correct the deflection accuracy of the brake disc.

(4) Since the tension is not applied from the thrust direction, the following property of the rotor 10 to the brake pad is improved, and the rotor stops at a proper position pinched between the bake pads. Further, since the tension is applied from the inner periphery of the rotor, the rotor is not rattle in the thrust direction at the position.

(5) The brake disc can be structured by three parts including the rotor 10, the hub 20 and the ring spring 30, and it is possible to widely reduce the number of the parts in comparison with the conventional brake disc, for example, having thirty parts. In correspondence to this, it is possible to largely reduce the assembling man-hour and the cost.

(6) Since the protruding portions 11 of the rotor 10 and the projection portions 21 of the hub 20 are provided at a lot of positions, a heat lowering property of the rotor is improved, and since the ring spring is used as the elastic member, it is possible to get away the heat of the rotor by the ring spring in all the periphery of the hub, whereby the heat lowering performance can be improved significantly. Accordingly, it is possible to prevent the crack from being generated by the increase of the thermal stress near the pierce hole formed on the sliding surface of the rotor.

(7) In the case that the ring spring is used for connecting the hub and the rotor, it is possible to connect the hub and the rotor at a high strength.

(8) Since the projection portions in the axial direction are provided in the hub, it is possible to improve the strength in the thrust direction of the hub.

Embodiment 2

In accordance with the present embodiment, there is shown an example in which a setting property of the ring spring is improved and an easiness of manufacturing is improved. A bending angle of the ring spring 30 having the approximately L-shaped cross section is made gentle to about 90 degree as shown in FIG. 9C. Further, a protrusion piece 35 having approximately the same width as a width of the protrusion portion 11 of the rotor 10 is formed so as to leave a space in the peripheral direction of one line 30a, by notching one line 30a in the axial direction of the ring spring 30 up to a portion near a boundary portion with another line 30b in the radial direction toward the peripheral direction. A projection 36 is provided in a protruding manner in the peripheral direction on an outer peripheral surface of the protrusion piece 35, by previously forming a groove 36a in the peripheral direction in a portion of an inner peripheral surface of the protrusion piece 35 on the basis of a knurling process or the like. The projection 36 is provided for pressure contacting the ring spring 30 with the leading end portion of the protrusion portion 11 in the rotor 10, at a time of mounting the ring spring 30 to the projection portion 21 of the hub 20. An oblong hole 34 in the peripheral direction is formed at an approximately center position of another line 30b of the ring spring 30. A distance from the oblong hole 34 of another line 30b of the ring spring 30 to the projection 36 of the protrusion piece 35 is slightly shorter than a distance from the projection 25 of the hub 20 to the leading end (the inner peripheral surface) of the protrusion portion 11 in the rotor 10. A distance from the oblong hole 34 of another line 30b in the ring spring 30 to the protrusion piece 35 is set to be slightly longer than a distance from the projection 25 of the hub 20 to the leading end of the protrusion portion 11 in the rotor 10. The ring spring 30 may be constituted by a discontinuous open ring which is separated at one position in the peripheral direction, or a continuous integrally formed ring which is not separated.

Figure 9A:
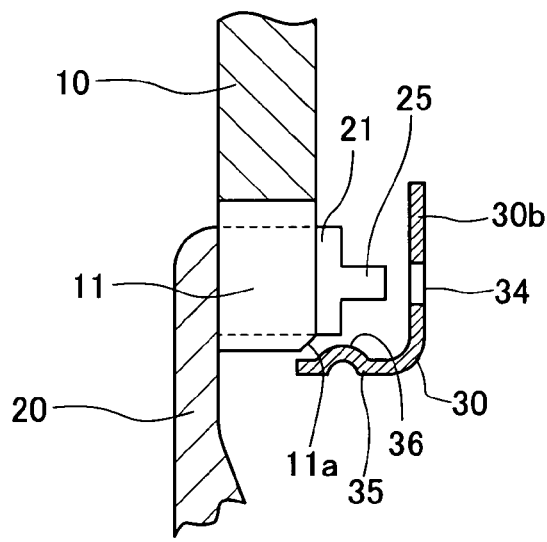
FIGS. 9A and 9B are cross sectional views showing an assembling method of a brake disc in accordance with an embodiment 2 of the present invention.

On the other hand, the protrusion piece 25 protruding in the axial direction is extended in the peripheral direction at an approximately center position of the projection portion 21 in the hub 20, as shown in FIG. 9A. The oblong hole 34 of the ring spring 30 has approximately the same outer shape as that of the protrusion piece 25 of the hub 20. The protrusion piece 25 of the projection portion 21 is inserted to the oblong hole 34 of another line 30b in the ring spring 30, by bringing the leading end of the protrusion piece 35 in the ring spring 30 into contact with the inner peripheral surface of the protrusion portion 11 in the rotor 10 protruding through the gap 22 between the projection portions 21 of the hub 20, and pressing the ring spring 30 in the axial direction. At this time, since the distance from the oblong hole 34 of another line 30b in the ring spring 30 to the protrusion piece 35 is set longer, the ring spring 30 can be easily pressed by bringing the protrusion piece 35 into contact with the inner peripheral surface of the protrusion portion 11 in the rotor 10. It is preferable to chamfer the end portion 11a in the inner peripheral surface side of the outer surface of the protrusion portion 11 in the rotor 10 in order to prevent the leading end of the protrusion piece 35 from striking.

Figure 9B:
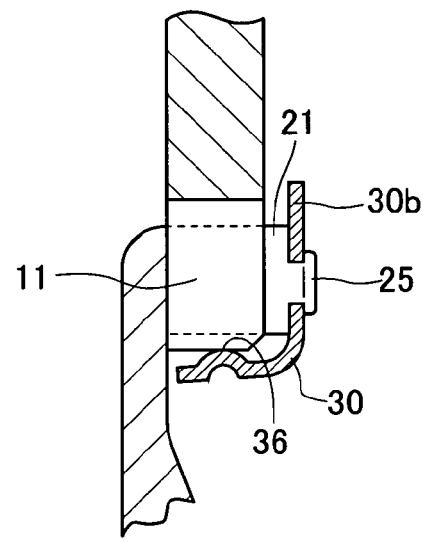
Figure 9C:
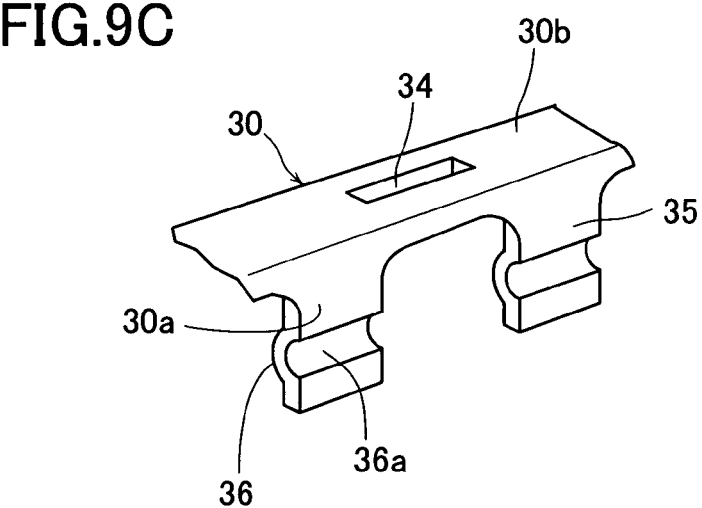
FIG. 9C is a perspective view showing a portion of a ring spring used in the embodiment 2.

Next, as shown in FIG. 9B, the ring spring 30 is fixed to the projection portion 21 by caulking the protrusion piece 25 inserted to the oblong hole 34 from the above of another line 30b. The protrusion piece 35 of one line 30a in the ring spring 30 presses the rotor 10 to the outer side in the radial direction from the inner peripheral surface side, on the basis of the pressure contact of the projection 36 with the inner peripheral surface of the protrusion portion 11 in the rotor 10.

Figure 9D:
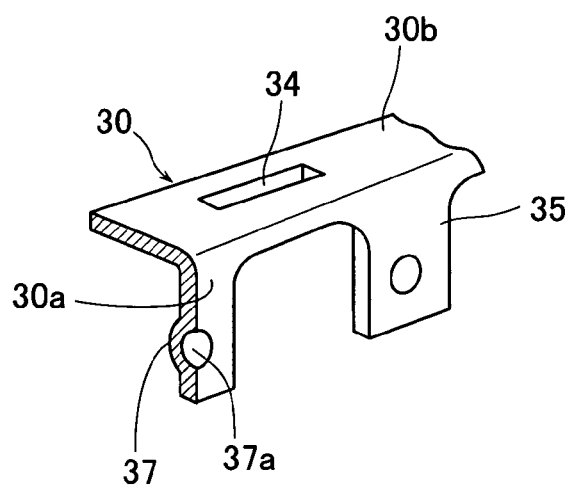
FIG. 9D is a perspective view showing a portion of another example of the ring spring used in the embodiment 2.

The projection provided in the protrusion piece 35 of one line 30a in the ring spring 30 may be formed as a dowel projection 37 by forming a dowel hole 37a on the outer peripheral surface of the protrusion piece 35, as shown in FIG. 9D.

In the case that the projections 36 and 37 are directly provided in one line 30a of the ring spring 30, a strong pressing force is required, and the setting property of the ring spring 30 is deteriorated. Accordingly, it is preferable to form the projections 36 and 37 in the protrusion piece 35 by forming the protrusion piece 35 in the line 30a of the ring spring 30 in accordance with the notching, as mentioned above.

In accordance with the present embodiment, the same operations and effects as those of the embodiment 1 can be achieved, and it is further possible to obtain an effect that the ring spring can be easily set.

Embodiment 3

The present embodiment shows an example employing the other spring than the ring spring having the approximately L-shaped cross section.

Figures 10A, 10B:
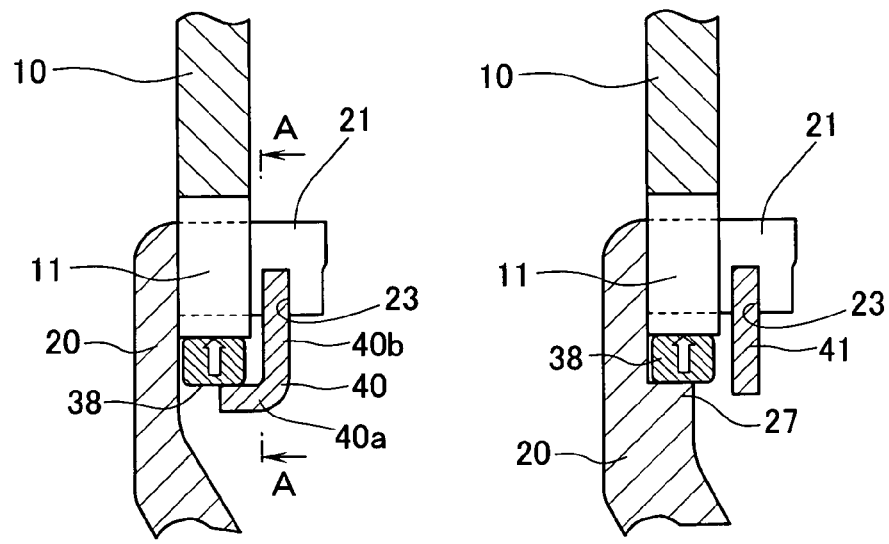
FIG. 10A is a cross sectional view showing an embodiment 3 in accordance with the present invention.
FIG. 10B is a cross sectional view showing a modified example of the embodiment 3.
Figure 10C:
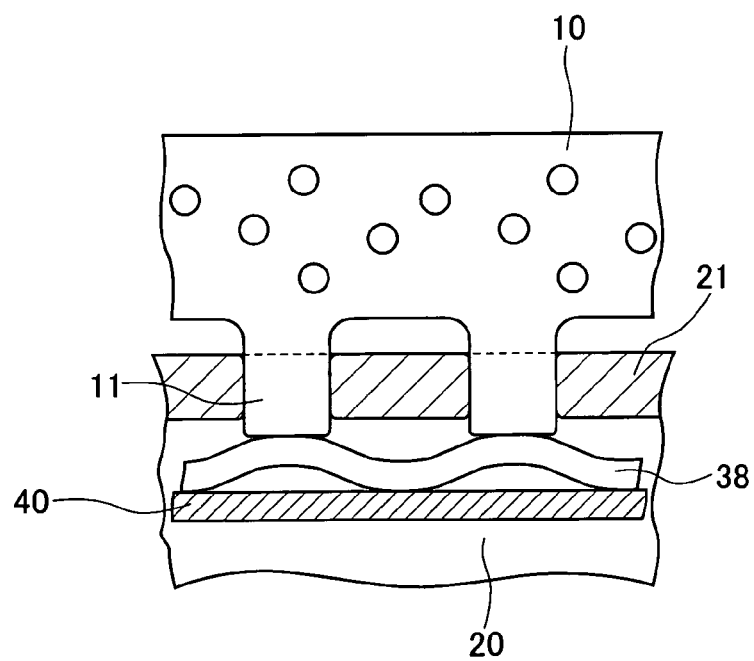
FIG. 10C is a cross sectional view along a line A-A in FIG. 10A.

In the present embodiment, as shown in FIG. 10A, the ring spring 38 is constituted by a corrugated continuous integrally formed ring or a discontinuous open ring. The ring spring 38 is pressure contacted with the inner peripheral surface side of the protruding portion 11 by deflecting the ring spring 38 so as to be contracted, and bringing the ring spring 38 into contact with the inner peripheral surface of the protrusion portion 11 of the rotor 10 facing to the inner side in the radial direction from the gap 22 between the projection portions 21 of the hub 20. Further, a line (another line) 40b in a radial direction of a hold ring 40 constituted by an open ring having an L-shaped cross section is fitted to the groove 23 provided in the inner peripheral surface of the leading end portion in the projection portion 21 of the hub 20, the end surface of the projection portion 21 is fixed by lightly pressing by means of a press machine, and a line (one line) 40a in an axial direction of the hold ring 40 is brought into contact with the inner peripheral surface of the ring spring 38. A view along a line A-A in FIG. 10A is shown in FIG. 10C.

In the present embodiment, the ring spring 38 presses the rotor 10 to the outer side in the radial direction from the inner peripheral surface, and the hold ring 40 receives the inner peripheral surface of the ring spring 38, and the hold ring 40 holds the ring spring 38 so as to prevent the ring spring from moving to the inner side in the radial direction, and the hold ring 40 doubles as a come-off prevention in the thrust direction of the rotor 10. The number of the parts of the brake disc is four including the rotor 10, the hub 20, the ring spring 38 and the hold ring 40.

The ring spring 38 may be held to the hub 20 in such a manner as shown in FIG. 10B. A step portion 27 is provided at a position close to an inner side of the outer peripheral edge portion of the hub 20, the ring spring 38 is fitted between the step portion 27 and the inner peripheral surface of the protrusion portion 11 of the rotor 10, and the inner peripheral surface of the ring spring 38 pressing the rotor 10 to the outer side in the radial direction from the inner peripheral surface side is received by the step portion 27 of the hub 10.

The rotor 10 is prevented from coming off in the thrust direction by a come-off prevention ring 41 constituted by an open ring which is independently provided in the projection portion 21 of the hub 20. The come-off prevention ring 41 is fitted and fixed to the groove 23 provided in the inner peripheral surface side of the leading end portion of the projection portion 21 in the hub 20. The number of the parts of the brake disc is four including the rotor 10, the hub 20, the ring spring 38 and the come-off prevention ring 41.

The same come-off preventing process as shown in FIG. 5 on the basis of the embodiment 1 may be applied to the line 40b in the axial direction of the hold ring 40 and the come-off prevention ring 41. Further, the line 40b in the axial direction of the hold ring 40 and the come-off prevention ring 41 may be mounted to the projection portion 21 of the hub 20, in accordance with the same manner as shown in FIG. 6 on the basis of the embodiment 2 or the same manner as shown in FIG. 7 or FIG. 8 on the basis of the embodiment 3.

In accordance with the present embodiment, the same operations and effects as those of the embodiment 1 can be achieved.

Embodiment 4

Figure 11:
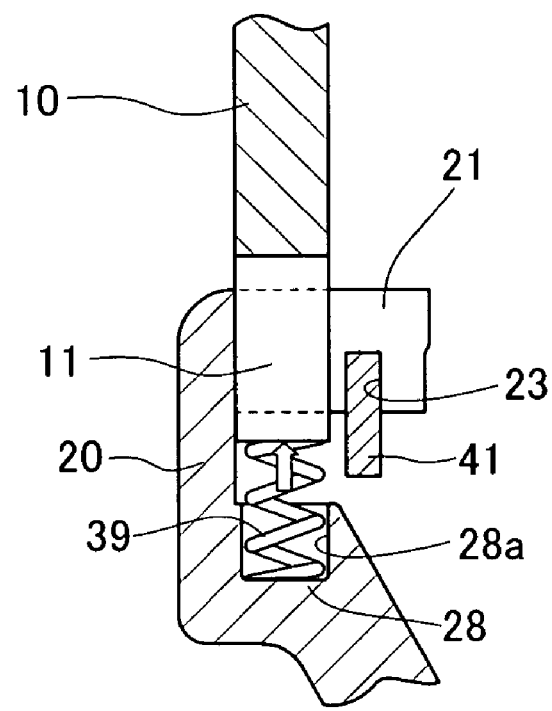
FIG. 11 is a cross sectional view showing an embodiment 4 in accordance with the present invention.

In the present embodiment, as shown in FIG. 11, a step portion 28 having a hole 28a in a radial direction is provided at a position close to the inner side of the outer peripheral edge portion of the hub 20 in each of the portions between the projection portions 21 of the hub 20, a coil spring 39 is planted in each of the holes 28a, and the rotor 10 is pressed to the outer side in the radial direction from the inner peripheral surface side by the coil spring 39. In the same manner, the rotor 10 is prevented from coming off in the thrust direction by fixing the come-off prevention ring 41 to the groove 23 provided in the inner peripheral surface of the leading end portion in the projection portion 21 of the hub 20.

In the brake disc in accordance with the present embodiment, in the case that the protrusion portion 11 of the rotor 10 is provided at ten to twenty positions, the number of the parts is thirteen to twenty three. Accordingly, the number of the parts is increased in comparison with the embodiments mentioned above, however, the number of the parts can be widely reduced in comparison with the number of the parts in the conventional brake disc, for example, of the seven-axis specification, that is, thirty.

In the embodiments 1 to 3 mentioned above, the ring springs are all made of metal, however, may be made of rubber. Further, in the embodiment 4, the elastic member is constituted by the coil spring, however, may be constituted by an air damper.

As mentioned above, in accordance with the floating type brake disc on the basis of the embodiments 1 to 4, there can be obtained a lot of advantages such that it is possible to absorb the shock applied to the hub from the rotor at a time of running on the punishing road, it is possible to lower the dragging torque, it is unnecessary to correct the deflection accuracy of the brake disc, it is possible to improve the heat lowering performance, and it is possible to widely reduce the number of the parts, and the like.

Embodiment 5

Figure 12A:
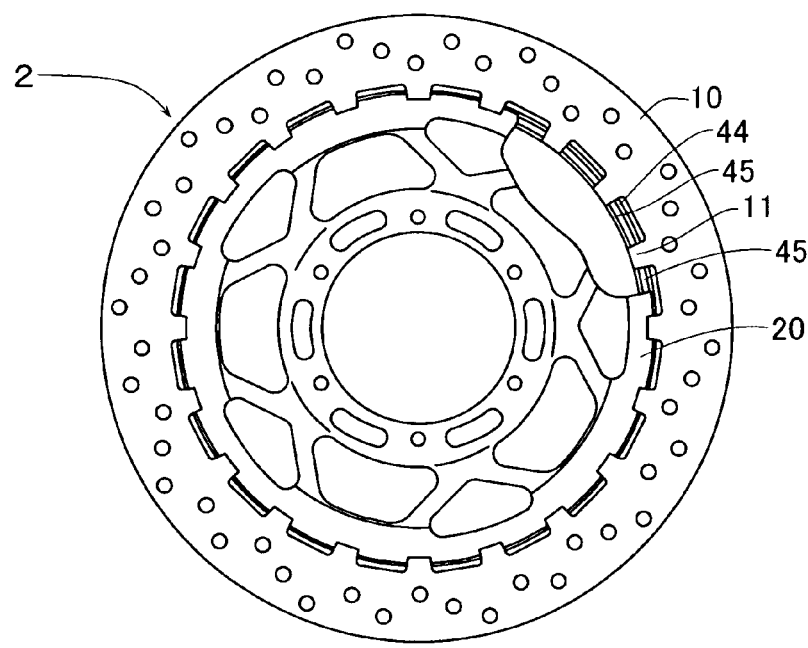
FIGS. 12A and 12B are respectively a front elevational view and a back elevational view showing a brake disc in accordance with an embodiment 5 of the present invention.
Figure 12B:
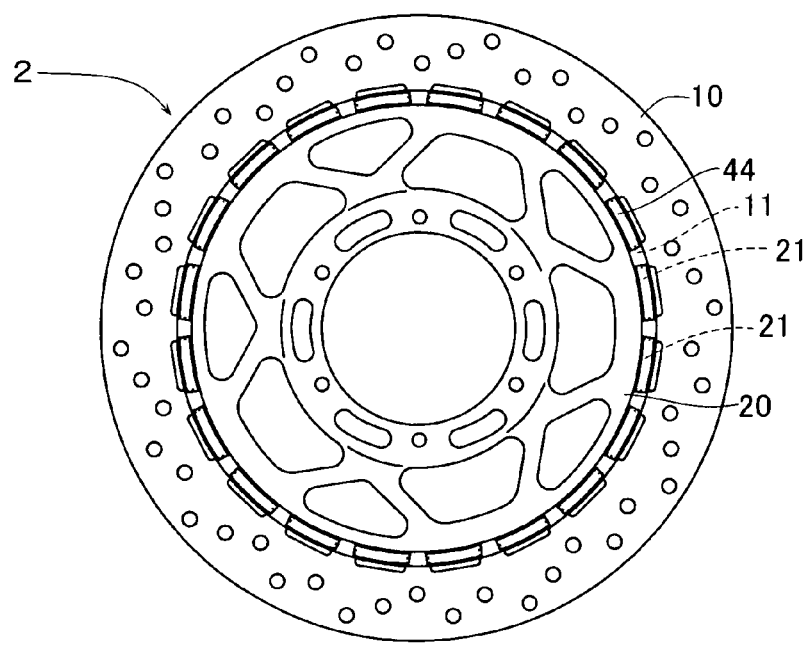
Figure 13A:
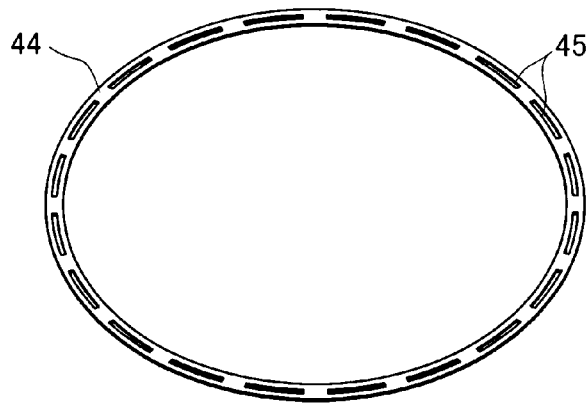
FIG. 13 is a perspective view of constituting parts of the brake disc in accordance with the embodiment 5 as seen from a back surface side, in which the constituting parts comprise a ring spring a, a rotor b and a hub c.
Figure 13B:
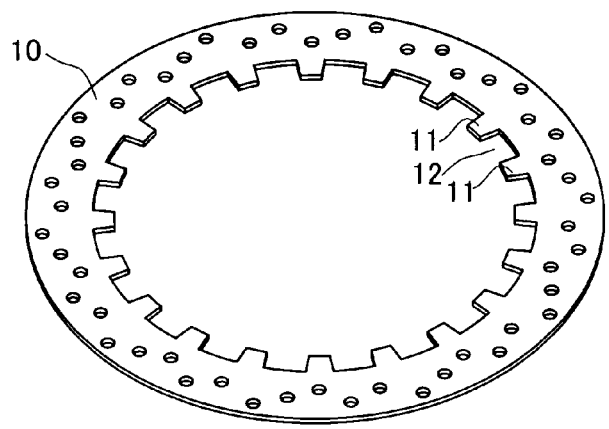
Figure 13C:
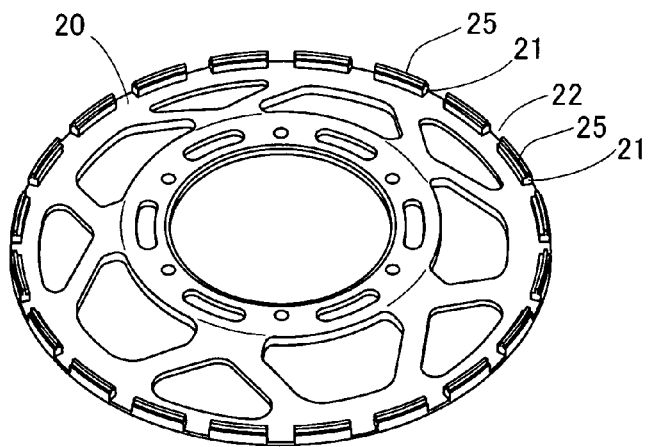
Figure 14:
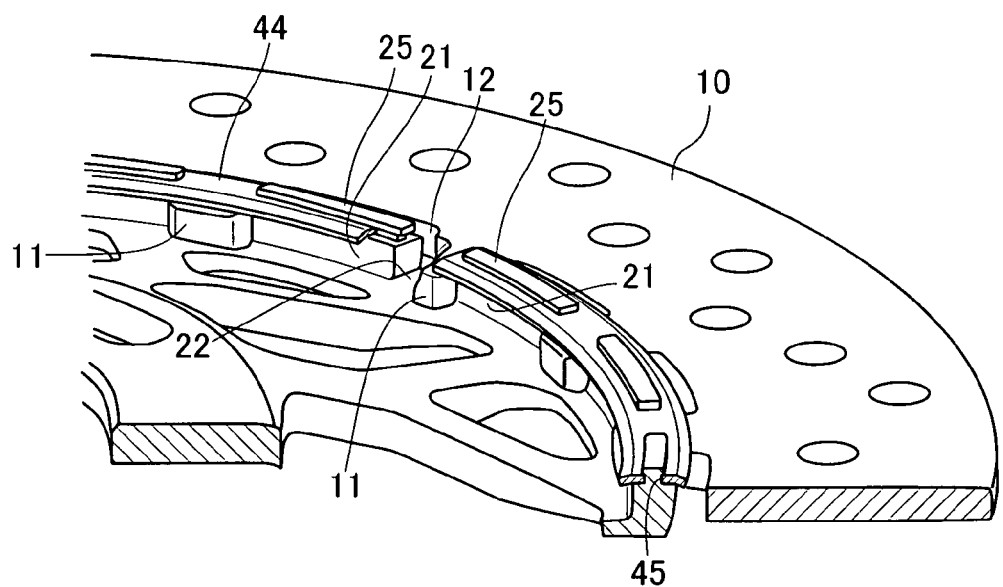
FIG. 14 is a perspective view showing a part of the brake disc in accordance with the embodiment 5 in a partly cutting manner.
Figures 15A, 15B:
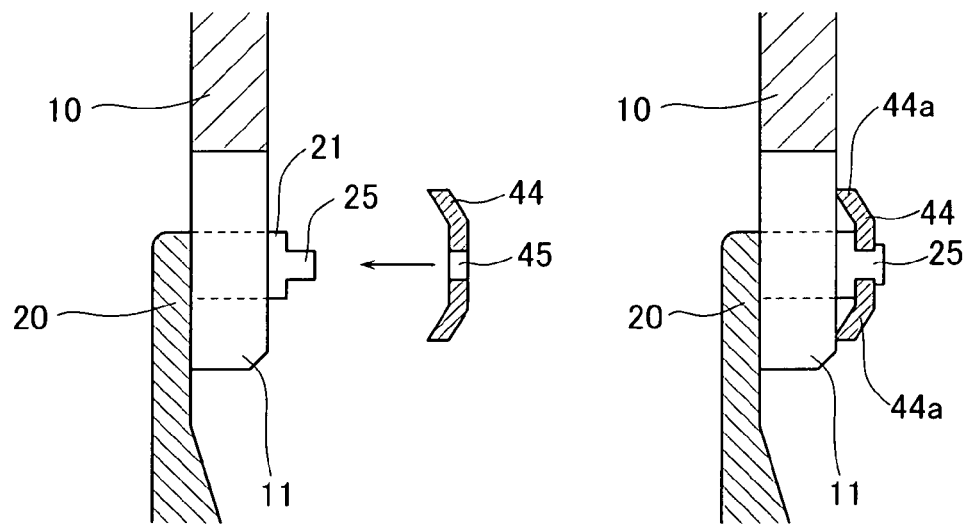
FIGS. 15A and 15B are cross sectional views showing an assembling method of the brake disc in accordance with the embodiment 5.

FIGS. 12A and 12B are views showing the other embodiment of the floating type brake disc in accordance with the present invention, in which FIG. 12A is a front elevational view and FIG. 12B is a back elevational view. FIG. 13 is a perspective view of constituting parts of the brake disc as seen from a back surface side, FIG. 14 is a perspective view showing a part of the brake disc in a partly cutting manner from a back surface side, and FIG. 15 is a cross sectional view showing an assembling method of the brake disc.

As shown in FIG. 12, a floating type brake disc 2 in accordance with the present embodiment is constituted by an annular rotor 10, a disc-like hub 20 and a band-like ring spring 44.

The rotor 10 is provided, as shown in FIG. 13, with a lot of, for example, ten to twenty four, protruding portions 11 protruding in a radial direction in an inner peripheral edge portion so as to leave a space in a peripheral direction, twenty protruding portions are provided in the present embodiment. The protruding portion 11 of the rotor 10 is provided with a protruding length lapping over an outer peripheral edge portion of the coaxially arranged hub 20. The hub 20 is provided with projection portions 21 protruding in an axial direction (the same direction as a direction of an axle) in a back surface side of the outer peripheral edge portion so as to leave a space in a peripheral direction. The projection portions 21 are provided at the same number as the number of the protruding portions 11 of the rotor 10, that is, twenty. A protrusion piece 25 extended in a peripheral direction is protruded from an approximately center portion of a leading end portion in the projection portion 21 of the hub 20. The rotor 10 and the hub 20 are coaxially overlapped, and as shown in FIG. 14, the projection portion 21 of the hub 20 passes through a gap 12 between the protrusion portions 11 of the rotor 10, and the leading end portion is protruded slightly in the axial direction from the protrusion portion 11.

The ring spring 44 is constituted by a ring having an approximately rectangular cross section and formed by curving an elastic metal thin plate in a gentle circular arc shape in a width direction, and is formed so as to have a larger width than a width of the projection portion 21 of the hub 20. The ring spring 44 may be constituted by a discontinuous open ring which is separated at one position in a peripheral direction, or may be constituted by a continuous integrally formed ring having no separation, however, the integrally formed ring is easily manufactured. The ring spring 44 is provided with the same number of oblong holes 45 as that of the projection portions 21 of the hub 20 so as to leave a space in the peripheral direction, and the oblong hole 45 has a larger outer shape than that of the protrusion piece 25 of the projection portion 21.

The ring spring 44 is fixed to the projection portion 21 (FIG. 15B) by fitting the oblong hole 45 to the protrusion piece 25 protruding from the protrusion portion 11 of the rotor 10 in the projection portion 21 of the hub 20 in a state in which a recess portion side of the curve of the ring spring 44 is set to an inner side (FIG. 15A), and caulking the protrusion piece 25 passing through the oblong hole 45 from the above of the ring spring 44. Accordingly, both end portions 44a in the width direction of the recess shape of the ring spring 44 is pressure contacted with the protrusion portion 11 of the rotor 10, and the rotor 10 is mounted to the hub 20 so as to be floatable in the axial direction in a state in which the rotor 10 is pressed to the outer side in the axial direction (the thrust direction) from the back surface side, whereby the floating type brake disc 2 is structured.

The floating type brake disc in accordance with the present embodiment is structured as mentioned above, the brake disc can be structured by three parts including the rotor 10, the hub 20 and the ring spring 44, and it is possible to significantly reduce the number of the parts in comparison with the conventional brake disc, for example, having forty two parts (the ten-axis specification). In accordance with this, it is possible to widely lower the assembling man-hour and the cost. Further, since a lot of protrusion portions 11 are provided in the rotor 10 and a lot of projection portions 21 are provided in the hub 20, the heat lowering property of the rotor can be improved, and since the ring spring is used as the elastic member, it is possible to discharge the heat of the rotor in all the periphery of the hub by the ring spring, so that the heat lowering performance can be significantly improved in view of this point. Accordingly, it is possible to prevent a crack from being generated by an increase of the thermal stress near the pierce hole formed on the sliding surface of the rotor. Further, since the contact surface of the ring spring 44 is positioned on the same surface on the rotor 10, it is possible to prevent the deflection of the spring 44 from being dispersed.

Embodiment 6

Figure 16:
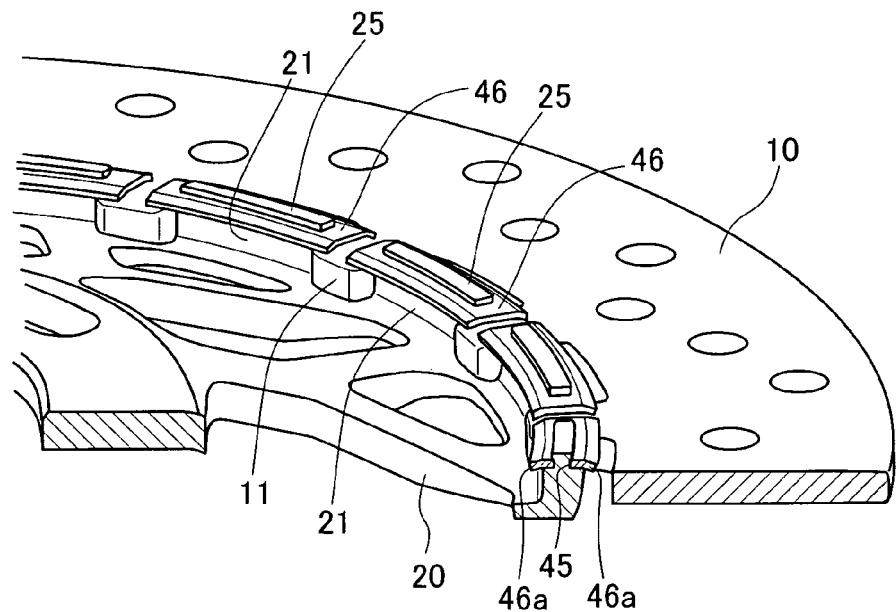
FIG. 16 is a perspective view showing a back surface side of a part of an embodiment 6 in accordance with the present invention.

The present embodiment is different from the embodiment 5 described with reference to FIGS. 12 to 15 in a point that a separated ring is used, as shown in FIG. 16.

A separated ring spring 46 is constituted by the same number of spring pieces as that of the projection portions 21 of the hub 20 (the protrusion portions 11 of the rotor 10), that is, twenty spring pieces. The spring piece is shorter than a spring piece which is obtained by separating the ring spring 44 in accordance with the embodiment 5 into twenty pieces in the peripheral direction, and is longer than the projection portion 21 of the hub 20. The other points, such as the cross sectional shape and the like of each of the separated ring springs 46 are the same as those of the ring spring 44.

Each of the separated ring springs 46 is fixed to the projection portion 21 of the hub 20 by fitting an oblong hole 45 of the separated ring spring 46 to the protrusion piece 25 protruding from the protrusion portion 11 of the rotor 10 in each of the projection portions 21 of the hub 20 in a state in which a recess portion side of a curve of each of the separated ring springs 46 is set to an inner side, and caulking the protrusion piece 25 of the hub 20 passing through the oblong hole 45 from the above of the separated ring spring 46. Accordingly, an end portion in the peripheral direction of the separated ring spring 46 in both sides is caught on each of the protrusion portions 11 of the rotor 10, both end portions 46a in a width direction of the recess shape of the end portion pressure contacts the protrusion portion 11, and the rotor 10 is mounted to the hub 20 so as to be floatable in the axial direction in a state in which the rotor 10 is pressed in the axial direction.

In accordance with the present embodiment, in the same manner as the embodiment 5 mentioned above, there can be obtained such effects that the heat lowering property of the rotor 10 is improved, and it is possible to prevent the deflection of the spring from being scattered. Further, in accordance with the present embodiment, since the separated ring spring is used, the number of the parts is increased in comparison with the embodiment 5 mentioned above, however, the parts is constituted only twenty two parts (separated ring spring×20+rotor+hub), so that it is possible to widely reduce the number of the parts to about a half in comparison with the conventional brake disc having forty two parts. Further, the separated ring spring is easily manufactured in comparison with the open ring spring and the integrally formed ring spring, and it is possible to intend to reduce the material and save the weight of the product.

Embodiment 7

Figure 17:
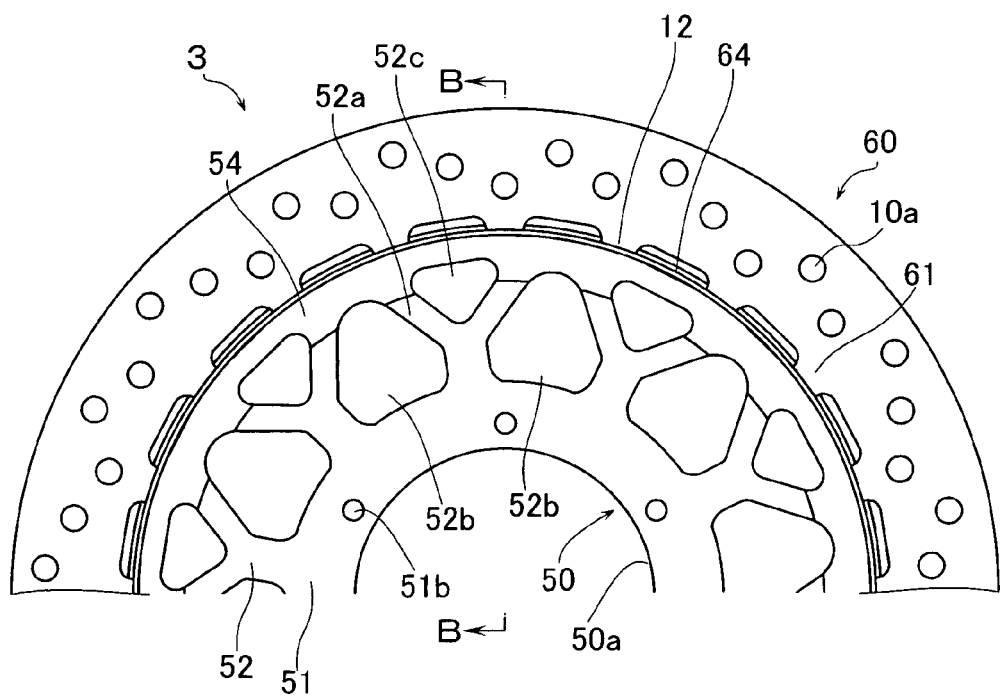
FIG. 17 is a front elevational view showing a half portion of a brake disc in accordance with an embodiment 7 of the present invention.
Figure 18:
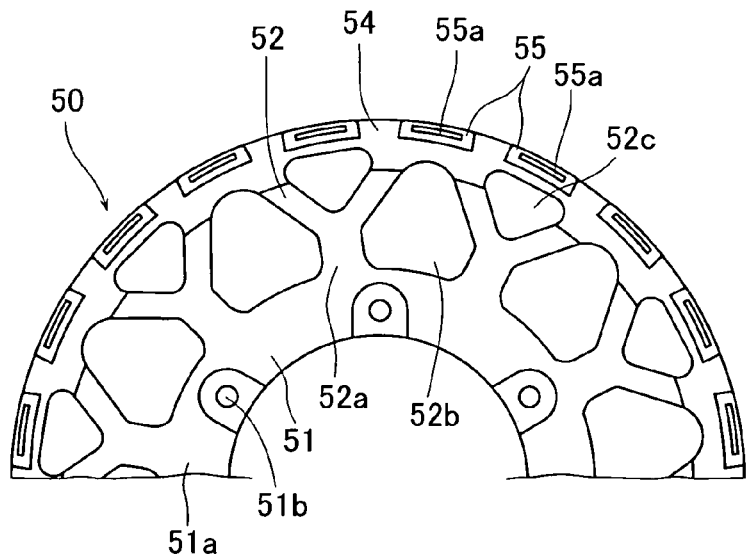
FIG. 18 is a back elevational view showing the half portion of a hub of the brake disc in accordance with the embodiment 7.

FIG. 17 is a front elevational view showing a half portion of a floating type brake disc in accordance with an embodiment 7, and FIG. 18 is a back elevational view showing a half portion of a hub in the brake disc. In the present embodiment, a floating type brake disc 3 is structured in the same manner as that of the embodiments 1 and 2, such that a rotor 60 is coaxially arranged in an outer side of a hub 50, and an outer peripheral edge portion 64 of the hub 50 and an inner peripheral edge portion 61 of the rotor 60 are connected so as to be floatable in an axial direction (in a thrust direction) via a ring spring 64 having an approximately L-shaped cross section.

The hub 50 is constituted by an annular plate provided with an opening 50a through which an axle passes, in a center portion. An inner peripheral portion around the opening 50a is formed as a mounting portion 51 to a wheel hub pivotally supporting the axle. A surface in a back surface side of the mounting portion 51, that is, an inner surface in the axial direction is formed as a mounting surface 51a, and is fixed by bolt to the wheel hub (not shown) via a mounting hole 51b.

The mounting portion 51 and the outer peripheral edge portion 54 of the hub 50 are formed as parallel flat plate portions except a point that a projection portion is provided in the outer peripheral edge portion 54. The outer peripheral edge portion 54 is offset at a predetermined amount (an offset amount L) to an outer side in the axial direction via an intermediate portion 52 which is inclined along a radial direction with respect to the mounting portion 51. The intermediate portion 52 of the hub 50 is provided with a larger weight saving hole 52b having an outward directed leading end and having an approximately pentagonal vertically longer shape, and a smaller weight saving hole 52c having an inward directed leading end at a position close to an outer side between the weight saving holes 52b and having an approximately triangular horizontally longer shape. The weight saving holes 52b and 52c are alternately provided along the peripheral direction. A portion between the weight saving holes 52b and a portion between the weight saving holes 52b and 52c are formed as a rib 52a.

A plurality of projection portions 55 protruding to an inner side in the axial direction are formed in a back surface side of the outer peripheral edge portion 54 of the hub 50 so as to leave a space in the peripheral direction, as shown in FIG. 18. In the present embodiment, in order to improve the lowering property of the heat transmitted to the hub 50 from the rotor 60 at a time of braking, the projection portions 55 of the outer peripheral edge portion 54 are provided at opposite positions to the weight saving holes 52b and 52c of the intermediate portion 52. A protrusion piece 55a protruding to the same direction is provided in a leading end of the projection portion 55.

Same number of protrusion portions 62 in the radial direction are formed in the inner peripheral edge portion 61 of the rotor 60 so as to leave a space in the peripheral direction, in such a manner as to correspond to the projection portions 55 of the hub 50. A circular small weight saving hole 60a is provided in the rotor 60, and the weight saving holes 60a are arranged, for example, so as to alternately repeat a two weight saving hole inclined arrangement and a three weight saving hole inclined arrangement in the peripheral direction.

Figure 19A:
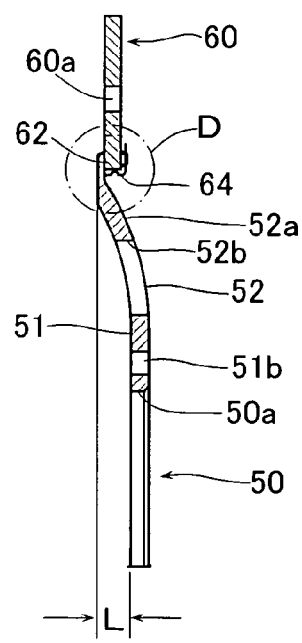
FIG. 19A is a cross sectional view along a line B-B in FIG. 17.
Figure 19B:
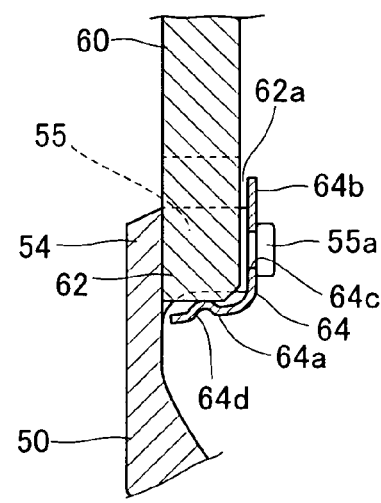
FIG. 19B is a detailed view of a portion D in FIG. 19A.

The ring spring 64 is constituted by an annular ring having an L-shaped cross section. In the present embodiment, in order to improve a setting property of the ring spring 64, a projection 64a is provided in one line 64a in accordance with a bending process, as shown in FIG. 19B, in the same manner as the embodiment 2. The ring spring 64 may be constituted by a discontinuous open ring which is separated at one position in the peripheral direction, or may be constituted by a continuous integrally formed ring having no separation.

In order to assemble the brake disc 3 in accordance with the present embodiment, the same manner as that of the embodiment 2 is applied. The protrusion portion 62 of the rotor 60 is inserted to the gap between the projection portions 55 of the hub 50, the leading end portion of the protrusion portion 62 is protruded to the inner side in the radial direction from the gap between the projection portions 55, and the leading end portion of the projection portion 55 is protruded to the inner side in the axial direction from the gap between the protrusion portions 62. Further, as shown in FIG. 19A and FIG. 19B showing details of a portion D in FIG. 19A, the ring spring 64 is fixed to the projection portion 55 by pressing the ring spring 64 in a state of bringing one line 64a of the ring spring 64 into contact with the leading end surface (the inner peripheral surface) of the protrusion portion 62, pressure contacting the projection 64d of one line 64a with the leading end surface of the protrusion portion 62, inserting the protrusion piece 55a of the projection portion 55 to the oblong hole 64c formed in another line 64b of the ring spring 64, and caulking the protrusion piece 55a with respect to another line 64b positioned so as to leave the gap 62a with the protrusion portion 62. Accordingly, the brake disc 3 in accordance with the present embodiment is formed by energizing the rotor 60 in a state of being pressed to the outer side in the radial direction from the inner peripheral side by the ring spring 64, and mounting the rotor 60 to the hub 50 by the ring spring 64 so as to be floatable in the axial direction (the thrust direction).

As mentioned above, the outer peripheral edge portion 54 is offset to the outer side in the axial direction at a predetermined amount L via the intermediate portion 52 inclined along the radial direction, with respect to the mounting portion 51 of the hub 50. In the present invention, the intermediate portion 52 is inclined in an aspect that the cross section along the radial direction of the intermediate portion 52 is bent so as to be convex to the inner side in the axial direction. In the present embodiment, as shown in FIG. 19A, the bending of the cross section in the radial direction of the intermediate portion 52 is constituted by one curved portion which is convex to the inner side in the axial direction. The offset amount L of the outer peripheral edge portion 54 to the mounting portion 51 of the hub 50 is defined as an amount for positioning the inner surface (the back surface) of the rotor 60 and the outer surface of the mounting portion 51 of the hub 50 on the same line.

In this case, since the outer peripheral edge portion of the hub 50 as being pressed bulges to the outer side in the axial direction, the flat outer peripheral edge portion 54 being parallel to the mounting portion 51 in an outer surface side is obtained by cutting the bulging outer surface side in a perpendicular direction to the axis. If the outer surface side of the outer peripheral edge portion 54 is formed in the flat shape, it is possible to prevent the interference with the parts around the brake disc, and the design of arranging the peripheral parts can be easily achieved.

The floating type brake disc in accordance with the present embodiment is structured mentioned above. In accordance with this, since the intermediate portion 52 between the mounting portion 51 and the outer peripheral edge portion 54 of the hub 50 is inclined in the aspect that the cross section extending along the radial direction is bent convex to the inner side in the axial direction, in place of being inclined linearly, strengths of the intermediate portion 52 in the thrust direction and the torsional direction are improved, so that even in the case that the area of the rib 52a between the weight saving holes is reduced by enlarging the weight saving holes 52b and 52c provided in the intermediate portion 52, it is possible to prevent the strength in the thrust direction and the strength in the torsional direction of the intermediate portion 52 from being lowered. Accordingly, it is possible to save weight of the hub 50 by enlarging the weight saving holes, and it is possible to save weight by making the hub 50 thin. Further, since the intermediate portion 52 is bent, the surface area of the intermediate portion 52 is increased, and the heat radiating performance of the hub 50 is improved.

Further, since the projection portion 55 in the axial direction is provided in the outer peripheral edge portion 54 of the hub 50, it is also possible to improve the strength in the thrust direction of the hub 50 in view of this point. Further, since the ring spring 64 is used for connecting the hub 50 and the rotor 60, and the ring spring 64 is firmly fixed by caulking the projection portion 55 of the hub 50, it is possible to connect the hub 50 and the rotor 60 at a high strength. Further, since the connection is achieved via the ring spring 64, the contact area between the hub 50 and the rotor 60 is increased, and the heat lowering property of the rotor 60 is improved on the basis of the heat transfer to the hub 50 from the rotor 60.

Figures 20A, 20B, 20C:
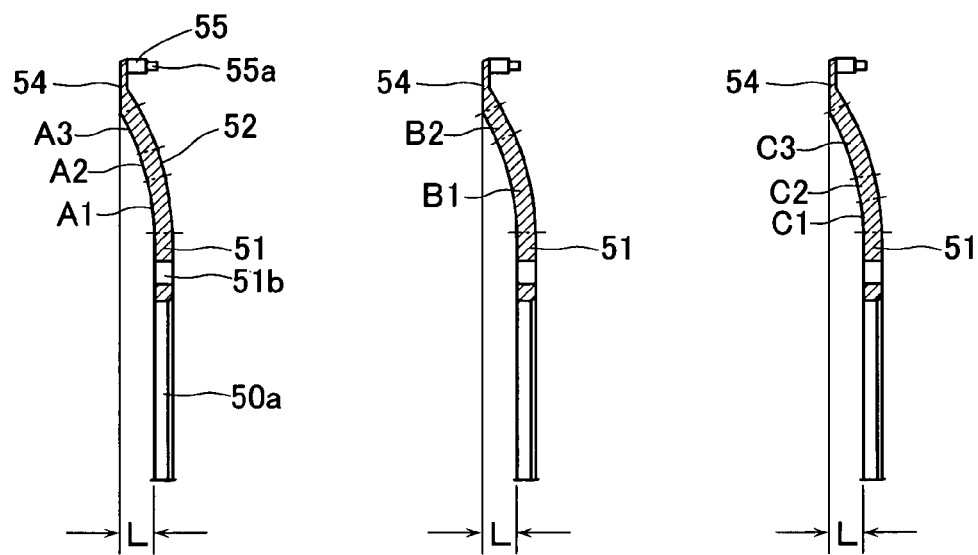
FIGS. 20A to 20C are schematic views showing a modified example of the hub in accordance with the embodiment 7.
Figures 21A, 21B:
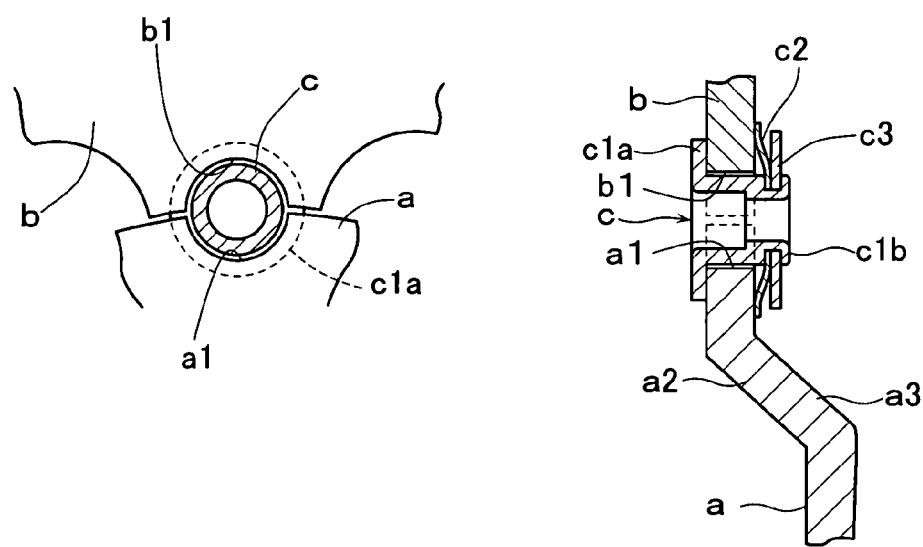
FIG. 21A is a plan view showing a conventional floating type brake disc.
FIG. 21B is a cross sectional view showing the brake disc.

In the embodiment mentioned above, the bending of the cross section in the radial direction of the intermediate portion 52 of the hub 50 is constituted by one curved portion, however, various aspects can be employed in addition to the structure mentioned above. In other words, as shown in FIG. 20A, the curved portion may be constituted by a middle curved portion A1 following to the mounting portion 51, a curved portion A3 being larger than the curved portion A1 and following to the outer peripheral edge portion 54, and a small inclined linear portion A2 provided therebetween (in FIG. 20A, the weight saving hole is omitted in order to avoid complication, the same is applied in the following description). The curved portion may be constituted by a large curved portion B1 following to the mounting portion 51, and a comparatively large inclined straight portion B2 provided between the curved portion B1 and the outer peripheral edge portion 54, as shown in FIG. 20B, or may be constituted by a small curved portion C1 following to the mounting portion 51, a comparatively large curved portion C3 following to the outer peripheral edge portion 54, and a small inclined straight portion C2 provided therebetween, as shown in FIG. 20C.

In the embodiment 7 mentioned above, the brake disc in which the rotor is mounted to the hub by the elastic member so as to be floatable in the axial direction is shown as the type of pressing the rotor to the outer side in the radial direction by the elastic member, however, the present invention can be applied to the brake disc of the type pressing the rotor in the axial direction by the elastic member as in the embodiment 5, and the same effect can be obtained by making the structure in the same manner as mentioned above.

The invention claimed is:

1. A floating type brake disc comprising:
   a hub;
   a rotor coaxially arranged in an outer side of the hub,
   wherein the rotor includes a plurality of protruding portions provided at an inner peripheral edge portion of the rotor and extending in a direction away from the inner peripheral edge portion of the rotor; and
   an elastic member having an approximately L-shaped cross section defined by a first leg and a second leg, wherein the first leg of the elastic member directly engages an axial end surface of the protruding portions extending from the rotor and the second leg of the elastic member directly engages the hub and extends parallel relative to the protruding portions, wherein the elastic member floatably mounts the rotor to the hub in an axial direction, and
   wherein the rotor is mounted to the hub in a state in which the rotor is pressed in a radial direction by the elastic member.

2. A brake disc as claimed in claim 1, wherein the plurality of protruding portions of the rotor define a space in a peripheral direction, the same number of projection portions in an axial direction as the number of the protruding portions are provided in a back surface side of an outer peripheral edge portion of the hub to define a space in a peripheral direction, the protruding portions of the rotor protrude to an inner side in the radial direction through a portion between the projection portions of the hub, and wherein the elastic member is a ring spring that presses an inner peripheral surface of the protruding portions of the rotor to an outer side in the radial direction by one line is fixed to a portion of the projection portions of the hub protruding in the axial direction from the protruding portion of the rotor.

3. A brake disc as claimed in claim 2, wherein a groove extending along a peripheral direction is provided in an inner peripheral surface of the portion of the projection portions of the hub protruding in the axial direction from the protruding portion of the rotor, another line of the ring spring is fitted to the groove, and the groove is collapsed by caulking the projection portion, whereby the ring spring is fixed to the projection portion.

4. A brake disc as claimed in claim 2, wherein a step portion is provided in an inner peripheral surface of the portion of the projection portions of the hub protruding in the axial direction from the protruding portion of the rotor, another line of the ring spring is brought into contact with the step portion, and the ring spring is fixed to the projection portion by caulking the projection portion from the above of the another line.

5. A brake disc as claimed in claim 2, wherein a protruding piece in the axial direction is provided in a protruding manner in the projection portion of the hub, a hole is provided in another line of the ring spring so as to insert the protruding piece to the hole, and the ring spring is fixed to the projection portion by caulking the inserted protruding piece from the above of the another line.

6. A brake disc as claimed in claim 5, wherein the protruding piece in the axial direction is formed by notching one line of the ring spring, and a pressure contacting projection toward an outer side in the radial direction is provided in the protruding piece.

7. A brake disc as claimed in claim 1, wherein an outer peripheral edge portion of the hub is offset to an outer side in the axial direction with respect to the mounting portion to a wheel in an inner peripheral side of the hub, and a cross section along the radial direction in an intermediate portion between the mounting portion and the outer peripheral edge portion of the hub is bent so as to be convex to an inner side of the axial direction.

8. A brake disc as claimed in claim 2, wherein an outer peripheral edge portion of the hub is offset to an outer side in the axial direction with respect to the mounting portion to a wheel in an inner peripheral side of the hub, and a cross section along the radial direction in an intermediate portion between the mounting portion and the outer peripheral edge portion of the hub is bent so as to be convex to an inner side of the axial direction.

9. A brake disc as claimed in claim 3, wherein an outer peripheral edge portion of the hub is offset to an outer side in the axial direction with respect to the mounting portion to a wheel in an inner peripheral side of the hub, and a cross section along the radial direction in an intermediate portion between the mounting portion and the outer peripheral edge portion of the hub is bent so as to be convex to an inner side of the axial direction.

10. A brake disc as claimed in claim 4, wherein an outer peripheral edge portion of the hub is offset to an outer side in the axial direction with respect to the mounting portion to a wheel in an inner peripheral side of the hub, and a cross section along the radial direction in an intermediate portion between the mounting portion and the outer peripheral edge portion of the hub is bent so as to be convex to an inner side of the axial direction.

11. A brake disc as claimed in claim 5, wherein an outer peripheral edge portion of the hub is offset to an outer side in the axial direction with respect to the mounting portion to a wheel in an inner peripheral side of the hub, and a cross section along the radial direction in an intermediate portion between the mounting portion and the outer peripheral edge portion of the hub is bent so as to be convex to an inner side of the axial direction.

12. A brake disc as claimed in claim 6, wherein an outer peripheral edge portion of the hub is offset to an outer side in the axial direction with respect to the mounting portion to a wheel in an inner peripheral side of the hub, and a cross section along the radial direction in an intermediate portion between the mounting portion and the outer peripheral edge portion of the hub is bent so as to be convex to an inner side of the axial direction.

* * * * *